(12) United States Patent
Vidavsky et al.

(10) Patent No.: US 11,118,004 B2
(45) Date of Patent: Sep. 14, 2021

(54) THREE-DIMENSIONAL INKJET PRINTING USING RING-OPENING METATHESIS POLYMERIZATION

(71) Applicant: Stratasys Ltd., Rehovot (IL)

(72) Inventors: Yuval Vidavsky, Moshav Sitriya (IL); Ira Yudovin-Farber, Rehovot (IL); Asher Razlan, Rehovot (IL); Lev Kuno, Tzur-Hadassah (IL); Gilles Recher, Marcq en Baroeul (FR); Renata Drozdzak-Matusiak, Wasquehal (FR)

(73) Assignee: Stratasys Ltd., Rehovot (IL)

( * ) Notice: Subject to any disclaimer, the term of this patent is extended or adjusted under 35 U.S.C. 154(b) by 15 days.

(21) Appl. No.: 16/095,384

(22) PCT Filed: Feb. 5, 2017

(86) PCT No.: PCT/IL2017/050141
§ 371 (c)(1),
(2) Date: Oct. 22, 2018

(87) PCT Pub. No.: WO2017/187434
PCT Pub. Date: Nov. 2, 2017

(65) Prior Publication Data
US 2019/0127517 A1    May 2, 2019

Related U.S. Application Data

(60) Provisional application No. 62/327,525, filed on Apr. 26, 2016.

(51) Int. Cl.
*C08G 61/08* (2006.01)
*B33Y 70/00* (2020.01)
(Continued)

(52) U.S. Cl.
CPC ............ *C08G 61/08* (2013.01); *B29C 64/112* (2017.08); *B33Y 10/00* (2014.12); *B33Y 70/00* (2014.12); *C08G 2261/418* (2013.01)

(58) Field of Classification Search
None
See application file for complete search history.

(56) References Cited

U.S. PATENT DOCUMENTS 5,059,266 A    10/1991  Yamane et al.
5,312,940 A    5/1994   Grubbs et al.
(Continued)

FOREIGN PATENT DOCUMENTS

CN    103338864    10/2013
EP    1498256      1/2005
(Continued)

OTHER PUBLICATIONS

Notification of Office Action dated Mar. 24, 2020 From the State Intellectual Property Office of the People's Republic of China Re. Application No. 201580069912.7. (9 Pages).
(Continued)

*Primary Examiner* — Satya B Sastri

(57) ABSTRACT

Methods for fabricating three-dimensional objects by 3D-inkjet printing technology are provided. The methods utilize curable materials that polymerize via ring-opening metathesis polymerization (ROMP) for fabricating the object, in combination with acid-activatable pre-catalyst and an acid generator activator. Kits containing modeling material formulations usable in the methods are also provided.

6 Claims, 4 Drawing Sheets

(51) Int. Cl.
  *B33Y 10/00* (2015.01)
  *B29C 64/112* (2017.01)

(56) References Cited

U.S. PATENT DOCUMENTS

| | | | |
|---|---|---|---|
| 5,342,909 | A | 8/1994 | Grubbs et al. |
| 5,491,200 | A | 2/1996 | Harris et al. |
| 5,710,298 | A | 1/1998 | Grubbs et al. |
| 5,728,917 | A | 3/1998 | Grubbs et al. |
| 5,831,108 | A | 11/1998 | Grubbs et al. |
| 6,001,909 | A | 12/1999 | Setiabudi |
| 6,259,962 | B1 | 7/2001 | Gothait |
| 6,569,373 | B2 | 5/2003 | Napadensky |
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 8,487,046 | B2 | 7/2013 | Recher et al. |
| 8,519,069 | B2 | 8/2013 | Drozdzak |
| 8,703,888 | B2 * | 4/2014 | Drozdzak ............ B01J 31/2265 526/145 |
| 8,927,670 | B2 * | 1/2015 | Schaubroeck .......... C07F 17/02 526/283 |
| 9,139,752 | B2 | 9/2015 | Desbois et al. |
| 10,259,210 | B2 | 4/2019 | Vidavsky et al. |
| 10,589,511 | B2 | 3/2020 | Vidavsky et al. |
| 2002/0055598 | A1 | 5/2002 | Lynn et al. |
| 2002/0111707 | A1 | 8/2002 | Li et al. |
| 2003/0032758 | A1 | 2/2003 | Harris et al. |
| 2004/0256754 | A1 | 12/2004 | Koguchi |
| 2005/0040564 | A1 * | 2/2005 | Oliver .................... C08G 61/12 264/494 |
| 2005/0255253 | A1 | 11/2005 | White et al. |
| 2006/0111807 | A1 | 5/2006 | Gothait et al. |
| 2007/0168815 | A1 | 7/2007 | Napadensky et al. |
| 2008/0023884 | A1 | 1/2008 | Konze et al. |
| 2009/0156766 | A1 | 6/2009 | Lemcoff et al. |
| 2010/0029801 | A1 | 2/2010 | Moszner et al. |
| 2011/0171147 | A1 | 7/2011 | Samorski et al. |
| 2012/0065755 | A1 | 3/2012 | Steingart et al. |
| 2012/0283406 | A1 | 11/2012 | Klitschke et al. |
| 2013/0065466 | A1 | 3/2013 | Desbois et al. |
| 2013/0073068 | A1 | 3/2013 | Napadensky |
| 2013/0128452 | A1 | 5/2013 | Baquiano et al. |
| 2013/0183519 | A1 | 7/2013 | Maeda |
| 2014/0312535 | A1 | 10/2014 | Dikovsky et al. |
| 2017/0251713 | A1 * | 9/2017 | Warner ................. B29C 64/106 |
| 2017/0306171 | A1 | 10/2017 | Vidavsky et al. |
| 2017/0341296 | A1 | 11/2017 | Fenn et al. |
| 2018/0029291 | A1 | 2/2018 | Matzner et al. |
| 2019/0009338 | A1 | 1/2019 | McMurtry et al. |
| 2019/0039321 | A1 | 2/2019 | Matzner et al. |
| 2019/0048217 | A1 | 2/2019 | Vidavsky et al. |
| 2019/0176387 | A1 | 6/2019 | Kuno et al. |
| 2019/0210354 | A1 | 7/2019 | Vidavsky et al. |
| 2020/0207070 | A1 | 7/2020 | Vidavsky et al. |
| 2020/0346397 | A1 | 11/2020 | Vidavsky et al. |

FOREIGN PATENT DOCUMENTS

| | | | |
|---|---|---|---|
| EP | 1757613 | | 2/2007 |
| EP | 2280017 | | 2/2011 |
| EP | 2452958 | | 5/2012 |
| EP | 2460587 | | 6/2012 |
| EP | 2480587 | A1 * | 8/2012 ........... C08G 59/621 |
| EP | 2801588 | | 11/2014 |
| GB | 2382798 | | 6/2003 |
| JP | 2002-264221 | | 9/2002 |
| JP | 2005-254583 | | 9/2005 |
| JP | 2010-095706 | | 4/2010 |
| JP | 2010-214858 | | 9/2010 |
| JP | 2014-506260 | | 3/2014 |
| WO | WO 97/20865 | | 6/1997 |
| WO | WO 97/29135 | | 8/1997 |
| WO | WO 99/51344 | | 10/1999 |
| WO | WO 2009/013751 | | 1/2009 |
| WO | WO 2013/072874 | | 5/2013 |
| WO | WO 2013/128452 | | 9/2013 |
| WO | WO 2014/144634 | | 9/2014 |
| WO | WO 2016/063282 | | 4/2016 |
| WO | WO 2016/125170 | | 8/2016 |
| WO | WO 2017/068590 | | 4/2017 |
| WO | WO 2017/134672 | | 8/2017 |
| WO | WO 2017/134673 | | 8/2017 |
| WO | WO 2017/134674 | | 8/2017 |
| WO | WO 2017/134676 | | 8/2017 |
| WO | WO 2017/187434 | | 11/2017 |

OTHER PUBLICATIONS

Final Official Action dated Jun. 9, 2020 from the US Patent and Trademark Office Re. U.S. Appl. No. 15/549,191. (29 pages).
Invitation Pursuant to Rule 137(4) EPC and Article 94(3) EPC dated Jun. 25, 2019 From the European Patent Office Re. Application No. 17706320.3. (2 Pages).
Translation of Notification dated Aug. 13, 2019 From OA dated Jul. 24, 2019 From the State Intellectual Property Office of the People's Republic of China Re. Application No. 201580069912.7. (15 Pages).
Translation Dated Apr. 20, 2020 of Notification of Office Action dated Mar. 24, 2020 From the State Intellectual Property Office of the People's Republic of China Re. Application No. 201580069912. 7. (11 Pages).
Official Action dated Sep. 30, 2019 From the US Patent and Trademark Office Re. U.S. Appl. No. 15/549,191. (46 pages).
Invitation Pursuant to Rule 137(4) EPC and Article 94(3) EPC dated Jun. 25, 2019 From the European Patent Office Re. Application No. 17709812.6. (2 Pages).
Applicant-Initiated Interview Summary dated May 14, 2018 From the US Patent and Trademark Office Re. U.S. Appl. No. 15/520,458. (2 pages).
International Preliminary Report on Patentability dated May 4, 2017 From the International Bureau of WIPO Re. Application No. PCT/IL2015/051038. (7 Pages).
International Preliminary Report on Patentability dated Nov. 8, 2018 From the International Bureau of WIPO Re. Application No. PCT/IL2017/050141. (7 Pages).
International Preliminary Report on Patentability dated Aug. 16, 2018 From the International Bureau of WIPO Re. Application No. PCT/IL2017/050136. (14 Pages).
International Preliminary Report on Patentability dated Aug. 16, 2018 From the International Bureau of WIPO Re. Application No. PCT/IL2017/050137. (8 Pages).
International Preliminary Report on Patentability dated Aug. 16, 2018 From the International Bureau of WIPO Re. Application No. PCT/IL2017/050138. (12 Pages).
International Preliminary Report on Patentability dated Aug. 16, 2018 From the International Bureau of WIPO Re. Application No. PCT/IL2017/050140. (10 Pages).
International Preliminary Report on Patentability dated Aug. 17, 2017 From the International Bureau of WIPO Re. Application No. PCT/IL2016/050135. (7 Pages).
International Search Report and the Written Opinion dated Apr. 3, 2017 From the International Searching Authority Re. Application No. PCT/IL2017/050141. (12 Pages).
International Search Report and the Written Opinion dated May 8, 2016 From the International Searching Authority Re. Application No. PCT/IL2016/050135.
International Search Report and the Written Opinion dated Apr. 10, 2017 From the International Searching Authority Re. Application No. PCT/IL2017/050138. (12 Pages).
International Search Report and the Written Opinion dated May 18, 2017 From the International Searching Authority Re. Application No. PCT/IL2017/050140. (15 Pages).

(56) References Cited

OTHER PUBLICATIONS

International Search Report and the Written Opinion dated May 22, 2017 From the International Searching Authority Re. Application No. PCT/IL2017/050137. (12 Pages).
International Search Report and the Written Opinion dated Aug. 24, 2017 From the International Searching Authority Re. Application No. PCT/IL2017/050136. (22 Pages).
International Search Report and the Written Opinion dated Jan. 28, 2016 From the International Searching Authority Re. Application No. PCT/IL2015/051038.
International Search Report and the Written Opinion dated Jan. 29, 2017 From the International Searching Authority Re. Application No. PCT/IL2016/051142. (12 Pages).
Invitation to Pay Additional Fees, Communication Relating to the Results of the Partial International Search and the Provisional Opinion dated Jun. 26, 2017 From the International Searching Authority Re. Application No. PCT/IL2017/050136. (18 Pages).
Notification of Office Action and Search Report dated Oct. 23, 2018 From the State Intellectual Property Office of the People's Republic of China Re. Application No. 201580069912.7 and Its Summary of Office Action in English. (19 Pages).
Official Action dated Jul. 12, 2018 From the US Patent and Trademark Office Re. U.S. Appl. No. 15/520,458. (35 pages).
Restriction Official Action dated Feb. 13, 2018 From the US Patent and Trademark Office Re. U.S. Appl. No. 15/520,458. (9 pages).
Supplementary European Search Report and the European Search Opinion dated Sep. 20, 2018 From the European Patent Office Re. Application No. 16746248.0. (8 Pages).
Supplementary European Search Report and the European Search Opinion dated Jun. 21, 2018 From the European Patent Office Re. Application No. 15852577.4. (6 Pages).
Ben-Asuly et al. "Photoactivation of Ruthenium Olefin Metathesis Initiators", Organometallics, 28: 4652-4655, Published on Web Jul. 24, 2009.
Diesendruck et al. "A Latent S-Chelated Ruthenium Benzylidene Initiator for Ring-Opening Metathesis Polymerization", Journal of Polymer Science, Part A: Polymer Chemistry, 47(16): 4209-4213, Published Online Jul. 8, 2009.
Doubrovski et al. "Voxel-Based Fabrication Through Material Property Mapping: A Design Method for Bitmap Printing", Computer-Aided Design, 60: 3-13, Available Online Jun. 5, 2014. Abstract, p. 7, Para 3.2.3, p. 11-12, Para 5.2, Section 3 'Voxed-Based Design for 3D Printing', Section 4 'Implementation'.
Doubrovski et al. "Voxel-Based Fabrication Through Material Property Mapping: A Design Method for Bitmap Printing", Computer-Aided Design, XP029107146, 60(C): 3-13, Mar. 2015. p. 1-9.
Fleet et al. "Inkjet Printing of Self-Healing Polymers for Enhanced Composite Interlaminar Properties", Journal of Materials Chemistry A, 3(5): 2283-2293, Published Online Dec. 8, 2014.
Gong et al. "ROMP of Acetoxy-Substituted Dicyclopentadiene to Linear Polymer With a High Tg", RSC Advances, 5(33): 26185-26188, Mar. 20, 2015.
Harris et al. "Photolithographic Patterning of Ring-Opening Metathesis Catalysts on Silicon", Advanced Materials, 17(1): 39-42, Published Online Jan. 6, 2005.
Khodabakhshi et al. "Anionic Polymerisation of Caprolactam at the Small-Scale via DSC Investigations: A Method to Be Used in an Additive Manufacturing Process", Journal of Thermal Analysis and Calorimetry, XP055377014, 115(1): 383-391, Published Online Aug. 8, 2013. p. 384, Para 1, Fig.1, Para 2.
Pastine et al. "Chemicals On Demand With Phototriggerable Microcapsules", Journal of the American Chemical Society, JACS, 131(38): 13586-13587, Sep. 30, 2009.
Piermattei et al. "Activating Catalysts With Mechanical Force", Nature Chemistry, 1(2): 133-137, Advanced Online Publication Apr. 6, 2009.
Saha et al. "Cross-Linked ROMP Polymers Based on Odourless Dicyclopentadiene Derivatives", Polymer Chemistry, 7(18): 3071-3075, Published Online Apr. 14, 2016.

Szadkowska et al. "Latent Thermo-Switchable Olefin Metathesis Initiators Bearing a Pyridyl-Functionalized Chelating Carbene: Influence of the Leaving Group's Rigidity on the Catalyst's Performance", Organometallics, 29: 117-124, Published on Web Dec. 14, 2009.
Vidavsky et al. "Light-Induced Olefin Metathesis", Beilstein Journal of Organic Chemistry, 6: 1106-1119, Nov. 23, 2010.
Wang et al. "Cationic RuII Complexes With N-Heterocyclic Carbene Ligands for UV-Induced Ring-Opening Metathesis Polymerization", Angewandte Chemie International Edition, 47(17): 3267-3270, Published Online Mar. 12, 2008.
Wilson et al. "Autonomic Healing of Epoxy Vinyl Esters via Ring Opening Metathesis Polymerization", Advanced Functional Materials, 18(1): 44-52, 2008.
Restriction Official Action dated Jun. 11, 2019 From the US Patent and Trademark Office Re. U.S. Appl. No. 15/549,191. (10 Pages).
Communication Pursuant to Article 94(3) EPC dated Feb. 22, 2019 From the European Patent Office Re. Application No. 15852577.4. (5 Pages).
Notification of Office Action dated Mar. 28, 2019 From the State Intellectual Property Office of the People's Republic of China Re. Application No. 201580069912.7. (11 Pages).
Notification of Office Action and Search Report dated Jul. 24, 2019 From the State Intellectual Property Office of the People's Republic of China Re. Application No. 201580069912.7. (13 Pages).
Thomas et al. "Thermally Stable, Latent Olefin Metathesis Catalysts", Organometallics, 30(24): 6713-6717, Published Online Nov. 18, 2011.
Office Action dated Dec. 15, 2019 From the Israel Patent Office Re. Application No. 253826 and Its Translation Into English. (5 Pages).
European Search Report and the European Search Opinion dated Jan. 30, 2020 From the European Patent Office Re. Application No. 19206004.4. (7 Pages).
Translation Dated Apr. 16, 2019 of Notification of Office Action dated Mar. 28, 2019 From the State Intellectual Property Office of the People's Republic of China Re. Application No. 201580069912.7. (4 Pages).
Notification of Reasons for Rejection dated Jul. 2, 2019 From the Japan Patent Office Re. Application No. 2017-521539 and Its Translation Into English. (7 Pages).
Supplementary European Search Report and the European Search Opinion dated Jun. 24, 2019 From the European Patent Office Re. Application No. 17747123.2. (6 Pages).
Office Action dated Jun. 3, 2020 From the Israel Patent Office Re. Application No. 251842 and Its Translation Into English. (5 Pages).
Notification of Reasons for Rejection dated Oct. 15, 2019 From the Japan Patent Office Re. Application No. 2017-521539 and Its English Summary. (2 Pages).
Communication Pursuant to Article 94(3) EPC dated Aug. 13, 2020 From the European Patent Office Re. Application No. 17747123.2. (5 Pages).
Restriction Official Action dated Dec. 4, 2020 From the US Patent and Trademark Office Re. U.S. Appl. No. 16/804,017. (6 Pages).
Restriction Official Action dated Jul. 9, 2020 from the US Patent and Trademark Office Re. U.S. Appl. No. 16/075,157. (8 pages).
Khodabakhshi "Anionic Polymerisation of Caprolactam: An Approach to Optimising the Polymerisation Conditions to be Used in a Jetting Process", PhD Thesis Submitted to Department of Materials, Loughborough University: 1-214, 2011.
Official Action dated Sep. 18, 2020 from the US Patent and Trademark Office Re. U.S. Appl. No. 16/075,159. (69 pages).
Official Action dated Jun. 18, 2020 from the US Patent and Trademark Office Re. U.S. Appl. No. 16/075,652. (59 pages).
Restriction Official Action dated Jun. 23, 2020 from the US Patent and Trademark Office Re. U.S. Appl. No. 16/075,159. (8 pages).
Official Action dated Feb. 12, 2021 From the US Patent and Trademark Office Re. U.S. Appl. No. 16/804,017. (39 Pages).
Restriction Official Action dated Feb. 10, 2021 From the US Patent and Trademark Office Re. U.S. Appl. No. 16/075,996. (6 Pages).

* cited by examiner

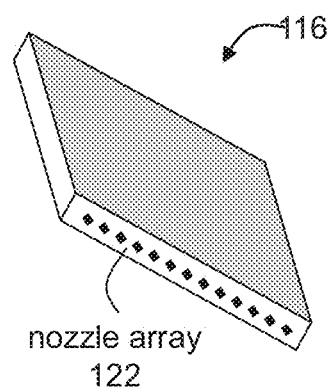 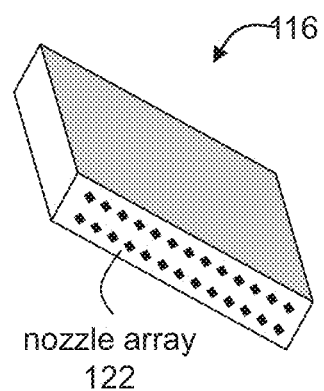
FIG. 3A   FIG. 3B
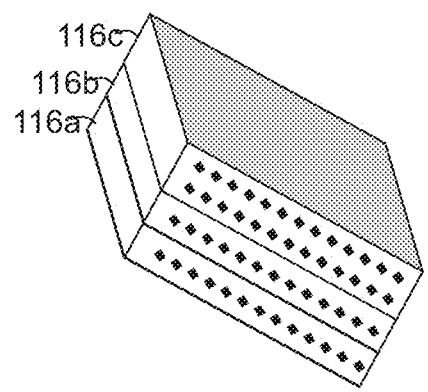
FIG. 3C
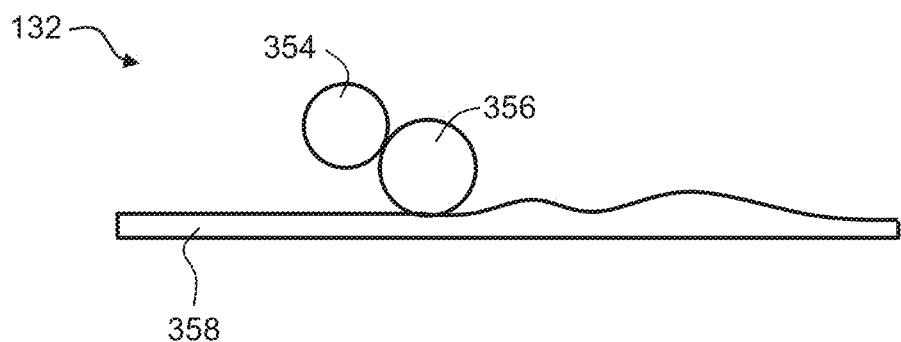
FIG. 4

THREE-DIMENSIONAL INKJET PRINTING USING RING-OPENING METATHESIS POLYMERIZATION

RELATED APPLICATIONS

This application is a National Phase of PCT Patent Application No. PCT/IL2017/050141 having International filing date of Feb. 5, 2017, which claims the benefit of priority under 35 USC § 119(e) of U.S. Provisional Patent Application No. 62/327,525 filed on Apr. 26, 2016. The contents of the above applications are all incorporated by reference as if fully set forth herein in their entirety.

FIELD AND BACKGROUND OF THE INVENTION

The present invention, in some embodiments thereof, relates to three-dimensional inkjet printing and, more particularly, but not exclusively, to systems, methods and compositions employing ring-opening metathesis polymerization (ROMP) for producing three-dimensional objects.

Three-dimensional (3D) inkjet printing is a known process for building three dimensional objects by selectively jetting chemical compositions, for example, polymerizable compositions, via ink-jet printing head nozzles onto a printing tray in consecutive layers, according to pre-determined image data. 3D inkjet printing is performed by a layer by layer inkjet deposition of chemical formulations, which form together a building material formulation. Thus, a chemical formulation is dispensed in droplets from a dispensing head having a set of nozzles to form layers on a receiving medium. The layers may then be cured or solidified using a suitable methodology, to form solidified or partially solidified layers of the building material.

The chemical formulations used for forming the building material may be initially liquid and subsequently hardened (cured or solidified) to form the required layer shape. The hardening may be effected, for example, by exposing the building material to a curing energy such as thermal energy (e.g., by heating the building material) or to irradiation (e.g., UV or other photo-irradiation), or may be activated chemically, for example, by acid or base activation.

The chemical (e.g., polymerizable) formulations utilized in inkjet 3D printing processes are therefore selected so as to meet the process requirements, namely, exhibiting a suitable viscosity during jetting (thus being non-curable under jetting conditions) and rapid curing or solidification, typically upon exposure to a stimulus, on the receiving medium. For example, when used with currently available commercial print heads, the formulations should have a relatively low viscosity, of about 10-25 cPs, at the jetting temperature, in order to be jettable.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

In a 3D inkjet printing process such as Polyjet™ (Stratasys Ltd. Israel), the building material is selectively jetted from one or more printing heads and deposited onto a fabrication tray in consecutive layers according to a pre-determined configuration as defined by a software file.

A printing system utilized in a 3D inkjet printing process may include a receiving medium and one or more printing heads. The receiving medium can be, for example, a fabrication tray that may include a horizontal surface to carry the material dispensed from the printing head. The printing head(s) may be, for example, an ink jet head having a plurality of dispensing nozzles arranged in an array of one or more rows along the longitudinal axis of the printing head. The jetting nozzles dispense material onto the receiving medium to create the layers representing cross sections of a 3D object.

In addition, there may be a source of curing energy, for curing the dispensed building material.

Additionally, the printing system may include a leveling device for leveling and/or establishing the height of each layer after deposition and at least partial solidification, prior to the deposition of a subsequent layer.

The building materials may include modeling materials and support materials, which form the object and optionally the temporary support constructions supporting the object as it is being built, respectively.

The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, upon exposure to a condition that affects curing of the materials, to form the required layer shape. After printing completion, support structures are removed to reveal the final shape of the fabricated 3D object.

In order to be compatible with most of the commercially-available printing heads utilized in a 3D inkjet printing system, the uncured building material should feature the following characteristics: a relatively low viscosity (e.g., Brookfield Viscosity of up to 35 cps, preferably from 8 to 20 cps) at the working (e.g., jetting) temperature; Surface tension of from about 10 to about 50 Dyne/cm; and a Newtonian liquid behavior and high reactivity to a selected curing energy, to enable immediate solidification of the jetted layer upon activation (e.g., application of curing energy).

For example, a thin layer (5-40 microns) of the building material should be sufficiently cured within about 200 milliseconds when exposed to UV radiation (of 0.5 W/cm$^2$, 340-390 nm), in order to enable the building of subsequent layers.

When a cured rigid modeling material forms the final object, the cured material should preferably exhibit heat deflection temperature (HDT) which is higher than room temperature, in order to assure its usability. Typically, the cured modeling material should exhibit HDT of at least 35° C. For an object to be stable in variable conditions, a higher HDT is desirable.

Currently, the most commonly used building materials in 3D inkjet printing are photocurable, particularly. UV-curable materials such as acrylic based materials.

Currently available UV-curable modeling material formulations for forming rigid objects by inkjet printing which exhibit the properties required for 3D inkjet printing, while being jetted, as described herein, are acrylic-based materials, which typically exhibit HDT in the range of 35-50° C. Exemplary such formulations are generally described, for example, in U.S. Pat. No. 7,479,510, to the present Assignee.

Such modeling material formulations, when cured, typically feature impact resistance in the range of 20-25 J/m.

While rigid objects, or parts thereof, fabricated by 3D inkjet printing, should desirably exhibit good durability and stability, a cured modeling material should feature both high HDT and high toughness, i.e. impact resistance.

Ring-opening metathesis polymerization (ROMP) is a type of olefin metathesis chain-growth polymerization. The driving force of the reaction is the relief of strained cyclic structures, typically cyclic olefins (e.g., norbornenes or cyclopentenes) or dienes (e.g., cyclopentadiene-based compounds). The polymerization reaction typically occurs in the presence of organometallic catalysts, and the ROMP catalytic cycle involves formation of metal-carbene species, which reacts with the double bond in the cyclic structure to thereby form a highly strained metallacyclobutane intermediate. The ring then opens, giving a linear chain double bonded to the metal with a terminal double bond as well. The as formed metal-carbene species then reacts with the double bond on another cyclic monomer, and so forth.

During recent decades ROMP evolved as a powerful polymerization tool especially due to the development of well-defined transition metal complexes as catalysts. Ruthenium, molybdenum and osmium carbene complexes useful as catalysts of ROMP reactions are described, for example, in U.S. Pat. Nos. 5,312,940, 5,342,909, 5,728,917, 5,710,298, 5,831,108, and 6,001,909; and PCT International Patent Applications having Publication Nos. WO 97/20865, WO 97/29135 and WO 99/51344.

The use of ROMP reactions in reaction injection molding (RIM) has been described, for example, in U.S. Patent Application Publication Nos. 2011/0171147, 2005/0691432, U.S. Pat. No. 8,487,046, EP Patent Application Publication No. 2452958, and EP Patent No. 2280017. One of the ROMP materials used in ROMP-based RIM is dicyclopentadiene (DCPD).

Poly-DCPD-based materials exhibit good mechanical properties and combine both good toughness and high thermal resistance. For example, polymeric materials based on DCPD were used to produce Telene 1810, which features a viscosity of about 200 cps at room temperature, HDT of 120° C. and impact of 300 J/m; and Metton M15XX, which features a viscosity of 300 cps at room temperature, Tg of 130° C. and impact of 460 J/m [see, for example, www(dot)metton(dot)com/index(dot)php/metton-lmr/benefits].

Additional background art includes WO 2013/128452; Adv. Funct. Mater. 2008, 18, 44-52; Adv. Mater. 2005, 17, 39-42; and Pastine, S. J.; Okawa. D.; Zettl. A.; Fréchet, J. M. J. J. Am. Chem. Soc. 2009, 131, 13586-13587; Vidavsky and Lemcoff, *Beilstein J. Org. Chem.* 2010, 6, 1106-1119; Ben-Asuly et al., Organometallics 2009, 28, 4652-4655; Piermattei et al., Nature Chemistry, DOI: 10.1038/NCHEM.167; Szadkowska et al., Organometallics 2010, 29, 117-124; Diesendruck, C. E.; Vidavsky, Y.; Ben-Asuly, A.; Lemcoff, N. G., *J. Polym. Sci., Part A: Polym. Chem.* 2009, 47, 4209-4213; Wang et al., Angew. Chem. Int. Ed. 2008, 47, 3267-3270; U.S. Patent Application Publication No. 2009-0156766; WO 2014/144634; EP Patent No. 1757613; U.S. Pat. No. 8,519,069; U.S. Patent Application Publication No. 2005/0040564 and PCT International Application No. PCT/IL2015/051038 published as WO 2016/063282.

SUMMARY OF THE INVENTION

A need exists for a 3D inkjet printing technology which employs curable materials that exhibit, upon curing, improved mechanical performance, particularly a combination of high thermal resistance and high toughness.

Ring Opening Metathesis Polymerization (ROMP) systems are used for producing cured materials that exhibit valuable properties, such as relatively low shrinkage, high thermal resistance, high impact, and chemical and solvent resistance.

However, the ROMP technology is limited to methodologies such as, for example, RIM, mainly due to its rapid curing at ambient conditions (e.g., room temperature). Typically, a formulation polymerizable by ROMP immediately solidifies once a catalyst is added and/or activated. This limits the use of ROMP formulations in 3D inkjet processes, where liquid formulations that feature viscosity within a pre-determined range are required to be passed through inkjet printing heads.

The present inventors have now designed various methodologies which enable using ROMP formulations in 3D inkjet printing.

Embodiments of the present invention therefore relate to formulations and methods (processes) employing same which efficiently allow practicing ROMP-based methodologies while meeting the requirements of 3D inkjet printing processes.

According to an aspect of some embodiments of the present invention there is provided a method of fabricating a three-dimensional object, the method comprising sequentially forming a plurality of layers in a configured pattern corresponding to the shape of the object, thereby fabricating the object, wherein the formation of each layer comprises dispensing at least two modeling material formulations by at least two inkjet printing heads, each head jetting one of the at least two modeling material formulations, the at least two modeling material formulations comprising an unsaturated cyclic monomer polymerizable by ring opening metathesis polymerization (ROMP) and a catalyst system for initiating ROMP of the monomer, the catalyst system comprising a pre-catalyst and an activator for chemically activating the catalyst towards initiating ROMP of the monomer, wherein at least one of the modeling material formulations comprises the pre-catalyst and at least another modeling material formulation comprises the activator and is devoid of the pre-catalyst, wherein the pre-catalyst is an acid-activatable Ruthenium-based pre-catalyst and the activator is active towards chemically activating the pre-catalyst.

According to some of any of the embodiments described herein, the pre-catalyst comprises at least one bidentate Schiff base ligand.

According to some of any of the embodiments described herein, the Schiff base ligand is derived from a salicyl-diamine derivative.

According to some of any of the embodiments described herein, the pre-catalyst is represented by Formula I:

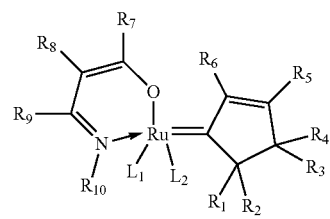

Formula I wherein;

$L_1$ and $L_2$ are each independently selected from common ligands of ruthenium-based catalysts for ROMP, such as a nucleophilic carbene ligand and halogen, or, alternatively, one of $L_1$ and $L_2$ is a bidentate Schiff base ligand, as described herein;

$R_1$, $R_2$, $R_3$, $R_4$, $R_5$ and $R_6$ are each independently selected from the group consisting of hydrogen, halogen, alkyl, alkenyl, alkynyl, aryl, heteroalkyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is absent or is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is any one or more of the $R_1$, $R_2$, $R_3$, $R_4$, $R_5$ and $R_6$ which may be linked together to form a cyclic group;

$R_7$, $R_8$, $R_9$ and $R_{10}$ are each independently selected from the group consisting of hydrogen, halogen, alkyl, alkenyl, alkynyl, aryl, heteroalkyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, and borate, or, alternatively, two of $R_7$-$R_{10}$ form together a cyclic ring.

According to some of any of the embodiments described herein, $R_1$, $R_2$, $R_3$ and $R_4$ form together a cyclic ring, preferably an aromatic ring (e.g., phenyl).

According to some of any of the embodiments described herein, $R_5$ is an aryl (e.g., phenyl).

According to some of any of the embodiments described herein, $R_{10}$ is an aryl (e.g., phenyl).

According to some of any of the embodiments described herein, two of $R_7$, $R_8$ and $R_9$ form a cyclic ring, preferably an aromatic ring (e.g., phenyl).

According to some of any of the embodiments described herein. $L_1$ is a nucleophilic carbene ligand, preferably a carbene ligand represented by the Formula:

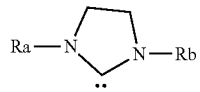

wherein Ra and Rb are each independently alkyl, cycloalkyl or aryl (e.g., phenyl).

According to some of any of the embodiments described herein. $L_2$ is halogen (e.g., chloro).

According to some of any of the embodiments described herein, the pre-catalysts is represented by Formula II:

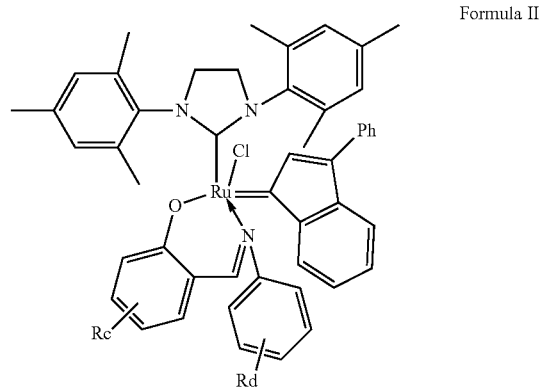

Formula II wherein Rc and Rd each independently represent one or more substituents which are each independently as defined herein for $R_7$-$R_9$.

According to some of any of the embodiments described herein, one of $L_1$ and $L_2$ is the bidentate Schiff base ligand.

According to some of any of the embodiments described herein, $L_1$ is a nucleophilic carbene ligand and $L_2$ is the bidentate Schiff base ligand.

According to some of any of the embodiments described herein, the pre-catalyst is represented by the Formula III:

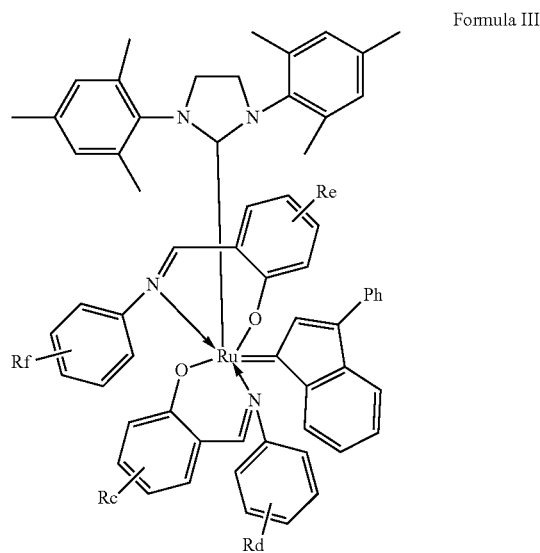

Formula III wherein Rc and Rd are as defined herein, and Re and Rf are as defined herein for Rc and Rd.

According to some of any of the embodiments described herein, the pre-catalyst is selected from the group of pre-catalysts presented in Table B.

According to some of any of the embodiments described herein, the pre-catalyst comprises at least two pre-catalysts, each being independently represented by Formulae I, II or III, as defined herein.

According to some of any of the embodiments described herein, one of the pre-catalysts is represented by Formula I, wherein $L_1$ is a nucleophilic carbene ligand and $L_2$ is halogen, and another one of the pre-catalysts is represented by Formula I, wherein $L_1$ is a nucleophilic carbene ligand and $L_2$ is a bidentate Schiff base ligand.

According to some of any of the embodiments described herein, one of the pre-catalysts is represented by Formula II and one of the pre-catalysts is represented by Formula III.

According to some of any of the embodiments described herein, a ratio between the two pre-catalysts ranges from 90:10 to 10:90, or from 80:20 to 20:80, or from 60:40 to 40:60.

According to an aspect of some embodiments of the present invention there is provided a method of fabricating a three-dimensional object, the method comprising sequentially forming a plurality of layers in a configured pattern corresponding to the shape of the object, thereby fabricating the object, wherein the formation of each layer comprises dispensing at least two modeling material formulations by at least two inkjet printing heads, each head jetting one of the at least two modeling material formulations, the at least two modeling material formulations comprising an unsaturated cyclic monomer polymerizable by ring opening metathesis polymerization (ROMP) and a catalyst system for initiating ROMP of the monomer, the catalyst system comprising a pre-catalyst and an activator for chemically activating the catalyst towards initiating ROMP of the monomer, wherein at least one of the modeling material formulations comprises the pre-catalyst and at least another modeling material formulation comprises the activator and is devoid of the pre-catalyst, wherein the pre-catalyst comprises at least one pre-catalyst represented by Formula II as defined herein and at least one catalyst represented by Formula II as defined herein.

According to some of any of the embodiments described herein, a ratio between the two pre-catalysts ranges from 90:10 to 10:90, or from 80:20 to 20:80, or from 60:40 to 40:60.

According to some of any of the embodiments described herein, the activator is active towards chemically activating the pre-catalyst.

According to some of any of the embodiments described herein, a total concentration of the pre-catalyst ranges from 0.0001 to 0.5%, or from 0.01 to 0.1%, or from 0.03 to 0.06%, by weight, of the total weight of the modeling material formulation comprising same.

According to some of any of the embodiments described herein, the activator is represented by the Formula:

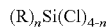

$(R)_n Si(Cl)_{4-n}$ wherein:
n is 1, 2, or 3, and R is selected from hydrogen, alkyl and aryl, such that when n is 2 or 3, each R can be the same or different, and such that at least one R is alkyl or aryl.

According to some of any of the embodiments described herein, the activator is selected from the group of activators presented in Table C.

According to some of any of the embodiments described herein, the activator is selected from trichlorododecyl silane (TCSA), trichloro(phenyl)silane and chlorodimethylphenyl silane.

According to some of any of the embodiments described herein, a concentration of the activator ranges from 0.002 to 2%, or from 0.01 to 1%, by weight, of the total weight of the modeling material formulation comprising the activator.

According to some of any of the embodiments described herein, each of the modeling material formulations is characterized by a viscosity of no more than 35 centipoises at a temperature of the inkjet printing head during the dispensing.

According to some of any of the embodiments described herein, at least one of the formulations comprises the monomer and the activator and at least another one of the formulations comprises the monomer and the pre-catalyst.

According to some of any of the embodiments described herein, at least one of the formulations comprises a ROMP inhibitor.

According to some of any of the embodiments described herein, at least one of the modeling material formulations comprises a ROMP monomer, the pre-catalyst and a ROMP inhibitor and at least another one of the modeling material formulations comprises a ROMP monomer and the activator.

According to some of any of the embodiments described herein, a concentration of the ROMP inhibitor ranges from 1 to 200 ppm, or from 1 to 60 ppm, or from 1 to 20 ppm, or from 10 to 20 ppm, of the total weight of a modeling material formulation comprising same.

According to some of any of the embodiments described herein, at least one of the modeling material formulations further comprises toughening agent (e.g., an impact modifying agent).

According to some of any of the embodiments described herein, each of the modeling material formulations further comprises a toughening agent (e.g., an impact modifying agent).

According to some of any of the embodiments described herein, the toughening agent is an elastomer (an elastomeric material), and in some embodiments, it is a low molecular elastomer or otherwise an elastomer as described herein in any of the respective embodiments.

According to some of any of the embodiments described herein, a concentration of the toughening agent ranges from 1 to 20%, or from 1 to 10%, or from 5 to 10%, by weight, of a modeling material comprising same.

According to some of any of the embodiments described herein, a modeling material formulation that comprises the pre-catalyst further comprises an antioxidant.

According to some of any of the embodiments described herein, a modeling material that comprises the pre-catalyst further comprises a proton donor.

According to some of any of the embodiments described herein, the method further comprises heating each of the layers following the dispensing.

According to some of any of the embodiments described herein, the heating is by infrared radiation.

According to some of any of the embodiments described herein, the heating is by a ceramic radiation source.

According to some of any of the embodiments described herein, the dispensing is in a chamber, and wherein the heating comprises heating the chamber to a temperature of from 25° C. to 65° C.

According to some of any of the embodiments described herein, the plurality of layers are formed on a working tray, the method comprising heating the working tray to a temperature of from 25° C. to 65° C.

According to some of any of the embodiments described herein, the heating is to a temperature of about 50° C.

According to some of any of the embodiments described herein, for at least one layer, two different modeling material formulations are dispensed at adjacent locations within (or over) the layer.

According to some of any of the embodiments described herein, the method further comprises dispensing a support material formulation by at least one additional inkjet printing head.

According to some of any of the embodiments described herein, the method further comprises exposing the support material formulation to a condition for inducing polymerization or curing of the support material formulation.

According to some of any of the embodiments described herein, a temperature of an inkjet printing head for dispensing the at least one modeling material formulation ranges from 25° C. to 65° C.

According to some of any of the embodiments described herein, a temperature of an inkjet printing head for dispensing the at least one modeling material formulation ranges from 65° C. to about 85° C.

According to some of any of the embodiments described herein, the dispensing and/or the exposing are performed under inert atmosphere.

According to some of any of the embodiments described herein, the method further comprises straightening the layer by a leveling device.

According to some of any of the embodiments described herein, the method further comprises removing cured or partially cured formulation off the leveling device.

According to some of any of the embodiments described herein, the straightening is while the at least one formulation is at a cured or partially cured or uncured state.

According to some of any of the embodiments described herein, the straightening comprises milling.

According to an aspect of some embodiments of the present invention there is provided a kit, usable in a method as described herein. According to an aspect of some embodiments of the present invention there is provided a kit comprising at least two modeling material formulations as described herein in any of the respective embodiments, each of the formulations being individually packaged within the kit, as described in further detail hereinbelow. In some embodiments, the kit comprises the at least two modeling material formulations, and is identified for use, or is for use, in 3D inkjet printing of an object. In some embodiments, the kit comprises instructions to use the at least two modeling material formulations for manufacturing a 3D object by 3D inkjet printing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-C are schematic illustrations of printing heads according to some embodiments of the present invention; and FIG. 4 is a schematic illustration of a self-cleaning leveling device, according to some embodiments of the present invention.

DESCRIPTION OF SPECIFIC EMBODIMENTS OF THE INVENTION

Figure 1:
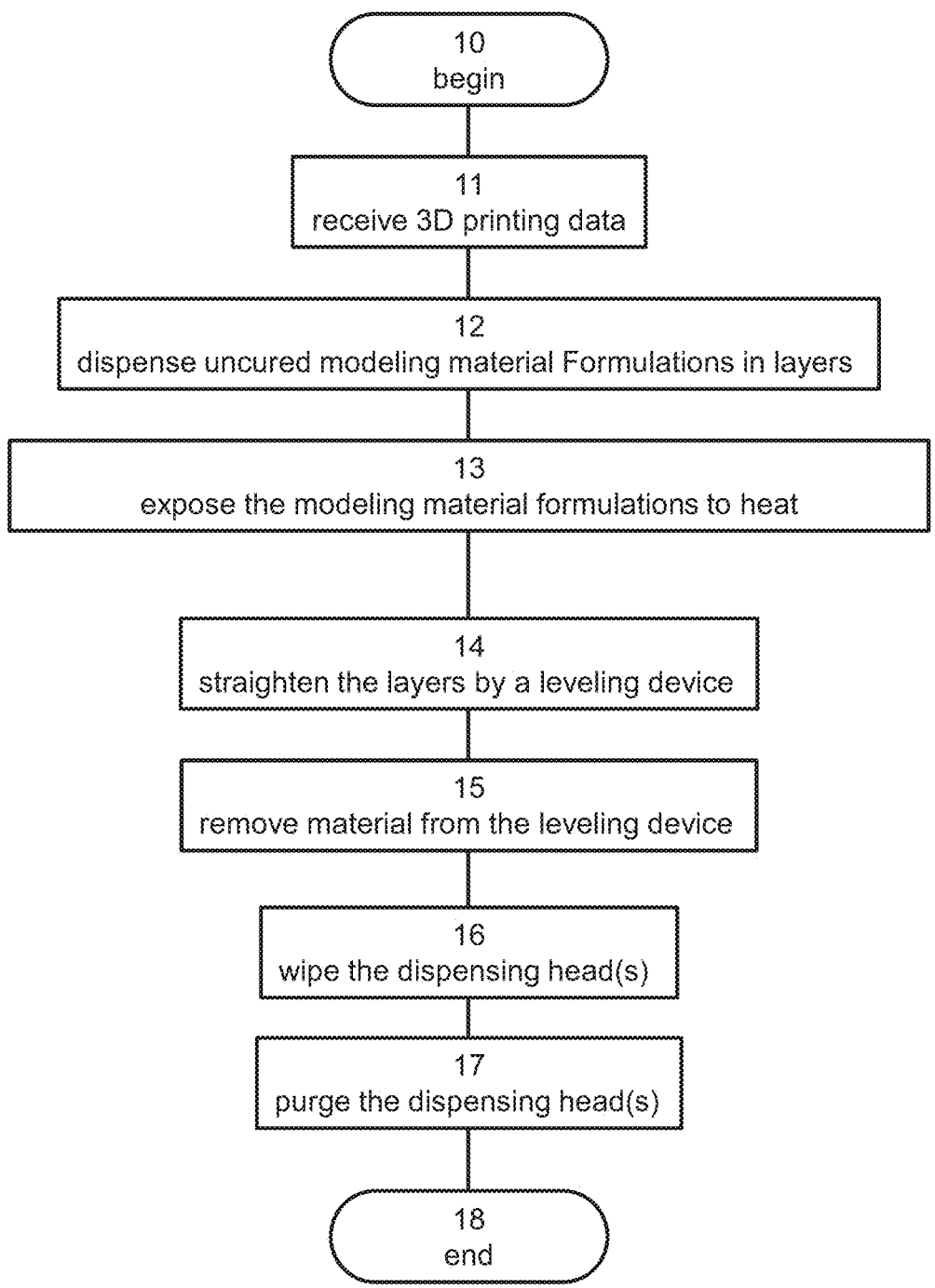
FIG. 1 is a flowchart describing an exemplary method according to some embodiments of the present invention.

The present invention, in some embodiments thereof, relates to three-dimensional inkjet printing and, more particularly, but not exclusively, to systems, methods and compositions employing ring-opening metathesis polymerization (ROMP) for producing three-dimensional objects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have sought for methodologies that enable utilizing materials obtained via ring opening metathesis polymerization (ROMP) in three-dimensional (3D) inkjet printing processes.

As discussed hereinabove, 3D inkjet printing systems require, on one hand, using building material formulations which exhibit certain properties while being dispensed from inkjet printing heads, and, on the other hand, aim to obtain three-dimensional objects which feature stability, durability and toughness.

Most of the currently available 3D inkjet printing processes utilize photocurable (e.g., UV curable) formulations. These formulations, while meeting the requirements of suitable viscosity at the jetting temperature and a rapid hardening upon exposure to irradiation, often provide objects with mechanical properties that are less than desired.

Materials obtained by ring-opening metathesis polymerization (ROMP) are characterized by exceptional mechanical and other properties. However, employing ROMP chemistry in 3D inkjet printing requires solving problems associated with, for example, fast propagation of the polymerization reaction, immediately once a catalyst contacts a ROMP monomer. Thus, for example, pre-mixing a ROMP monomer and a ROMP catalyst before jetting leads to substantial increase in viscosity when such a formulation passes through the inkjet printing head and nozzle plate, resulting in clogging due to polymerization of the composition on the nozzle plate. Other methodologies aimed at separately jetting a ROMP catalyst and a ROMP monomer were found by the present inventors to result in insufficient reactivity of the ROMP system or in models featuring physic-mechanical properties that do not meet the common requirements.

The present inventors have now designed and successfully practiced novel methodologies for utilizing the valuable properties of materials prepared by ROMP in the fabrication of three-dimensional objects which feature exceptional physic-mechanical properties in 3D inkjet printing processes.

The Method:

According to aspects of some embodiments of the present invention, there is provided a method of three-dimensional (3D) inkjet printing of a three-dimensional object. According to embodiments of these aspects, the method is effected by sequentially forming a plurality of layers in a configured pattern corresponding to the shape of the object, thereby forming the object.

According to embodiments of these aspects, formation of each layer is effected by dispensing at least one building material formulation (uncured building material), and exposing the dispensed building material formulation to a condition which affects curing of the formulation to thereby obtain a cured building material.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML). Additive Manufacturing File (AMF) format, Drawing Exchange Format (DXF), Polygon File Format (PLY) or any other format suitable for Computer-Aided Design (CAD).

Each layer is preferably formed by three-dimensional inkjet printing which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

When three-dimensional inkjet printing is employed, a building material (uncured) is dispensed from a dispensing head having a set of nozzles to deposit the building material in layers on a supporting structure. The inkjet printing system thus dispenses building material in target locations which are to be occupied and leaves other target locations void. The inkjet printing typically includes a plurality of dispensing heads, each of which can be configured to dispense a different building material formulation. Thus, different target locations can be occupied by different building materials.

The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g., for further support strength.

Herein throughout, the phrases "building material formulation", "uncured building material", "uncured building material formulation", "building material" and other variations therefore collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein, the phrase "printed object" describes a product of the additive manufacturing process (e.g., a 3D inkjet process), before the support material, if such has been used as part of the uncured building material, is removed.

Herein throughout, the term "object" or "model object" describes a final product of the additive manufacturing. This term refers to the product obtained by a method as described herein, after removal of the support material, if such has been used as part of the uncured building material. The "object" therefore essentially consists (e.g., at least 95 weight percents) of a cured modeling material.

The term "object" as used herein throughout refers to a whole object or a part thereof.

Herein throughout, the phrase "cured modeling material" describes the part of the building material that forms the object, as defined herein, upon exposing the dispensed building material to curing (and optionally post-curing treatment), and, optionally, if a support material has been dispensed, removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "modeling material" "model material" or simply as "formulation", describes a part or all of the uncured building material which is dispensed so as to form the object, as described herein. The modeling material formulation is an uncured modeling formulation (unless specifically indicated otherwise), which, upon exposure to a condition that effects curing (and optionally post-curing treatment), forms the object or a part thereof.

In some embodiments of the present invention, a modeling material formulation is formulated for use in three-dimensional inkjet printing and is able to form a three-dimensional object on its own. i.e., without having to be mixed or combined with any other substance.

An uncured building material can comprise one or more modeling materials, and can be dispensed such that different parts of the object are made, upon curing, of different cured modeling formulations, and hence are made of different cured modeling materials or different mixtures of cured modeling materials.

The method of the present embodiments manufactures three-dimensional objects in a layerwise manner by forming a plurality of layers in a configured pattern corresponding to the shape of the objects, as described herein.

The printed three-dimensional object is made of the modeling material or a combination of modeling materials or a combination of modeling material/s and support material/s or modification thereof (e.g., following curing). All these operations are well-known to those skilled in the art of solid freeform fabrication.

In some exemplary embodiments of the invention an object is manufactured by dispensing a building material that comprises two or more different modeling material formulations, each modeling material formulation from a different dispensing head of the inkjet printing apparatus. The modeling material formulations are optionally and preferably deposited in layers during the same pass of the printing heads. The modeling material formulations and/or combination of formulations within the layer are selected according to the desired properties of the object.

FIG. 1 presents a flowchart describing an exemplary method according to some embodiments of the present invention. It is to be understood that, unless otherwise defined, the operations described hereinbelow can be executed either contemporaneously or sequentially in many combinations or orders of execution. Specifically, the ordering of the flowchart is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which 3D printing data corresponding to the shape of the object are received. The data can be received, for example, from a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format. Drawing Exchange Format (DXF), Polygon File Format (PLY) or any other format suitable for Computer-Aided Design (CAD).

The method continues to 12 at which droplets of a building material as described herein are dispensed in layers, on a receiving medium, using at least two different multi-nozzle inkjet printing heads, according to the printing data. The receiving medium can be a tray of a three-dimensional inkjet system or a previously deposited layer. The building material comprises two or more modeling material formulations that can undergo polymerization via ROMP, as described herein. The building material can optionally further comprise a support material formulation.

In some embodiments of the present invention, the dispensing 12 is effected within an environment that is similar in its thermodynamic condition (for example, temperature, humidity, pressure) to the ambient environment. Alternatively, the dispensing 12 can be executed in a generally dry (e.g., relative humidity of less than 60% or less than 50% or less than 40%, or less) and inert environment. For example, the dispensing can be executed in a nitrogen environment. In these embodiments, dispensing 12 is executed in a chamber and is optionally and preferably preceded by an operation in which an inert gas, e.g., nitrogen, helium, krypton and the like is introduced into the chamber. Also contemplated is the use of a drying agent. Representative examples of drying agents suitable for the present embodiments include, without limitation, calcium chloride, calcium sulfide and silica gel.

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity of no more than X centipoises, where X is about 40 centipoises, or about 35 centipoises, or about 30 centipoises, preferably about 25 centipoises and more preferably about 20 centipoises, or 18 centipoises, or 16 centipoises, or 14 centipoises, or 12 centipoises, or 10 centipoises and even as low as 2 centipoises.

The heating can be executed before loading the respective formulation into the printing head of the 3D printing system, or while the formulation is in the printing head or while the formulation passes through the nozzle of the printing head.

In some embodiments, the heating is executed before loading of the respective formulation into the printing head, so as to avoid clogging of the printing head by the formulation in case its viscosity is too high.

In some embodiments, the heating is executed by heating the printing heads, at least while passing the formulations making up the building material through the nozzle of the printing head.

In some embodiments, a temperature of an inkjet printing head for dispensing a modeling material formulation as described herein is lower than 70° C., and ranges, for example, from about 25° C. to about 65° C., including any subranges and intermediate values therebetween. Modeling material formulations which comprise one or more monomers that undergo polymerization via ROMP, as described herein, and optionally other, non-curable components, are suitable for use in the context of these embodiments.

In some embodiments, higher temperatures of an inkjet printing head are required, for example, higher than 70° C. or ranging from about 65° C. to about 95° C., including any subranges and intermediate values therebetween.

Once the uncured building material is dispensed on the receiving medium according to the 3D printing data, the method optionally and preferably continues to 13 at which the deposited layers are exposed to a condition (or two or more conditions) that induces ROMP, as defined herein (e.g., a curing condition). Preferably, each individual layer is exposed to this condition following or during the deposition of the layer, and prior to the deposition of the subsequent layer.

In some embodiments, exposing to a condition that induces ROMP (e.g., a curing condition) is performed under a generally dry and inert environment, as described herein.

In these embodiments, the dry and inert environment is optionally and preferably prepared before the material is dispensed so that 13 can be executed simultaneously with 12 wherein the material is exposed to the environment upon exiting the inkjet printing head.

Alternatively, the exposure 13 can include exposing the dispensed layer to radiation, such as, but not limited to, electromagnetic radiation, for example, infrared radiation (e.g., at a wavelength of from about 800 nm to about 4 µm), ultraviolet radiation (e.g., at a wavelength of from about 200 nm to about 400 nm) and visible or near-visible light radiation (e.g., at a wavelength of from about 400 nm to about 800 nm), or particle radiation, for example in the form of an electron beam, depending on the modeling material being used. Preferably, but not necessarily, the infrared radiation is applied by a ceramic lamp, for example, a ceramic lamp that produces infrared radiation of from about 2.4 µm to about 4.3 µm, or from about 3 µm to about 4 µm, e.g. about 3.5 µm, or of any other wavelength suitable for efficient application of heat, as discussed hereafter. Alternatively or additionally, the exposure 13 can include exposing the dispensed layer to elevated temperature (for example, from about 25° C. to about 100° C., or from about 40° C. to about 100° C., or from about 25° C. to about 65° C., or from about 35° C. to about 50° C. or of about 50° C.). Higher temperatures (for example, above 100° C. or from about 100° C. to about 900° C., or from about 200° C. to about 900° C., e.g., about 300° C., or from about 300° C. to about 900° C. or from about 400° C. to about 900° C.) are also contemplated. The elevated temperatures can be generated by heating the tray on which the layers are dispensed, and/or the chamber within which the printing process is executed or by heat-inducing irradiation, using a radiation source as described herein, at a suitable wavelength for providing a required temperature. A ceramic lamp, for example, when operated at the above-described wavelengths, may result in heating a dispensed formulation to up to 300° C., and even to a temperature of from about 400° C. to about 900° C.

The method can preferably continue to 14 at which the deposited layer is straightened, for example, by a leveling device. Optionally, the layer is straightened after the dispensed formulation is cured (e.g., exposed to a curing condition, for example, heat). Alternatively, the layer is straightened while the dispensed formulation is still uncured. In some embodiments, straightening of a layer is performed so as to provide a certain (e.g., pre-determined) thickness of the layer, to thereby provide a plurality of layers in which a thickness of at least one, and preferably two or more, of the layers is controlled.

As used herein the phrase "cured" refers to a formulation that underwent curing or at least a partial curing, as defined herein, and encompasses a state of the formulation in which at least 20% or at least 30% or at least 40% or at least 50% or at least 60% or at least 70% of the formulation underwent curing, as defined herein, and a state of a formulation that underwent up to 100% curing.

Typically, a formulation that underwent curing or partial curing is characterized by a viscosity that is substantially higher than an uncured formulation, and preferably, a formulation, or at least a part thereof, solidifies upon curing. A "cured" formulation is also referred to interchangeably as a "hardened" formulation or as a "solidified" formulation.

Straightening or leveling of a layer or layers after curing (or partial curing) can be achieved by a leveling device that is capable of reforming the solidified portion of the formulation or removing part thereof. A representative example of such a leveling device is a roller capable of milling, grinding and/or flaking a solidified formulation or part thereof. Straightening can be achieved by a leveling device that is capable of leveling the formulation in its liquid, gel, partially-cured or cured state.

In some embodiments, the leveling device effects milling, grinding and/or flaking, and/or removes at least part of the top of a layer of the formulation. Such a leveling device can be, for example, a roller, a blade or a cutter.

In some embodiments of the present invention the method continues to 15 at which cured, partially cured or uncured formulation is removed off the leveling device. These embodiments are particularly useful when the leveling device is applied to the layer while the formulation is uncured or partially cured. In this case, a portion of the formulation collected by the leveling device can experience curing or partial curing while the formulation is on the leveling device (for example on the roller, when the leveling device comprises a roller), and the method preferably removes such cured or partially cured formulation from the device.

These embodiments can also be useful when the leveling device is applied to the layer while the formulation is cured (for example, when the leveling device effects milling, grinding flaking and/or removing part of the solidified portion of the formulation). In this case the method removes the debris of the milling, grinding, flaking or material removal process from the leveling device, using for example a suction device.

Operation 15 is preferably executed automatically and optionally also continuously while the leveling device is in motion over the layer. For example, the leveling device can comprise a double roller having a first roller that contacts and straightens the layer and a second roller that is in contact with the first roller but not with the layer and which is configured to remove the formulation from the first roller.

In some embodiments, the method continues to 16 at which remnant formulations are removed also from the surface of the dispensing heads, for example, via a wipe operation that can be executed at predetermined time intervals, for example, once the head completes a movement along the scanning direction or a cycle of reciprocal movements along the scanning direction. The wiping can be by a blade, or more preferably, a wet fabric.

In some embodiments, the method continues to 17 at which remnant formulations are purged out of the dispensing heads at a dedicated location on the tray that is laterally displaced from the location at which the object is being built.

The method ends at 18.

In some of any of the embodiments described herein, the building material comprises two or more modeling material formulations, as described in further detail hereinafter, and dispensing the building material comprises dispensing two or more modeling material formulations.

To ensure reaction between the first and second modeling material formulations, the deposition of the compositions can be performed in more than one way.

Figure 5A:
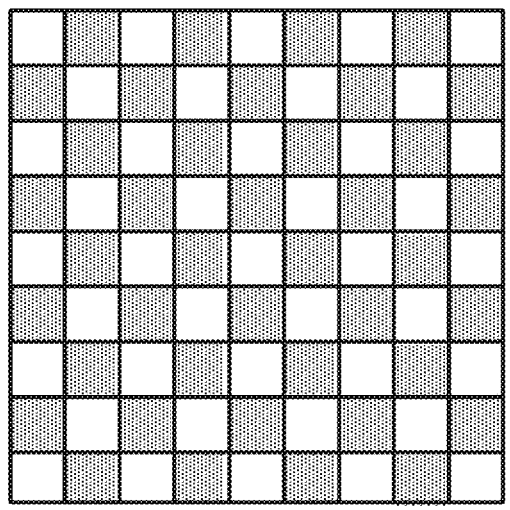
FIGS. 5A and 5B present schematic illustrations of bitmaps in embodiments of the invention in which a "Drop on Drop" printing protocol is employed. A bitmap suitable for the deposition of the first model formulation is illustrated in FIG. 5A and a bitmap suitable for the deposition of the second model formulation is illustrated in FIG. 5B. When the droplets of both formulations have the same or approximately the same weight, the bitmaps are useful for a 50:50 (or 1:1) w/w ratio. White boxes represent vacant locations, dotted boxes represent droplets of the first model formulation and wavy boxes represent droplets of the second model formulation. Each patterned (wavy/dotted) box represents a pixel (e.g., one composition droplet) in a layer. Both model formulations can be deposited at the same location, but at different times, during movement of the printing heads.
Figure 5B:
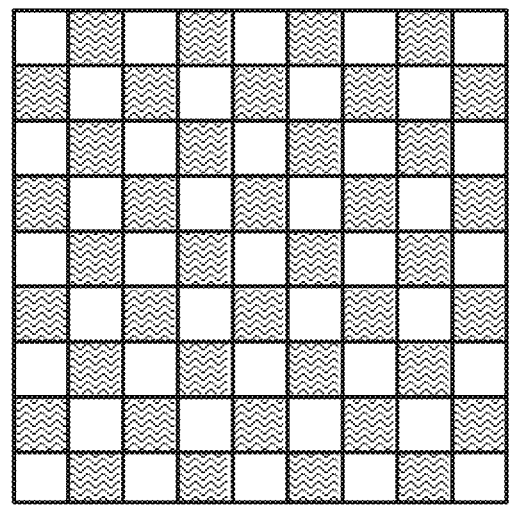

In some embodiments of the present invention a "Drop on Drop" printing protocol is employed. These embodiments are schematically illustrated in FIGS. 5A and 5B. A bitmap suitable for the deposition of the first modeling material formulation is illustrated in FIG. 5A and a bitmap suitable for the deposition of the second modeling material formulation is illustrated in FIG. 5B. White boxes represent vacant locations, dotted boxes represent droplets of the first modeling material formulation and wavy boxes represent droplets of the second modeling material formulation. The printing data in these embodiments are such that for each layer, both modeling material formulations are deposited at the same location, but different times, during movement of the printing head. For example, each droplet of a first modeling material formulation can be jetted on top of a droplet of a second modeling material formulation, or vice versa. Preferably, but not necessarily, the two formulation parts are jetted in drops at the same weight and/or rate. These embodiments are particularly useful when the desired weight ratio is 1:1. For other desired weight ratios, the two formulation parts are preferably jetted in drops of different weights, wherein the ratio of the weights corresponds to the desired ratio.

A representative example for a resolution suitable for the present embodiments is 1200 dpi in the X direction and 300 dpi in the Y direction. The drop on drop printing protocol allows the two types of drops to combine and mix before the crystallization of deposited material.

Figure 6A:
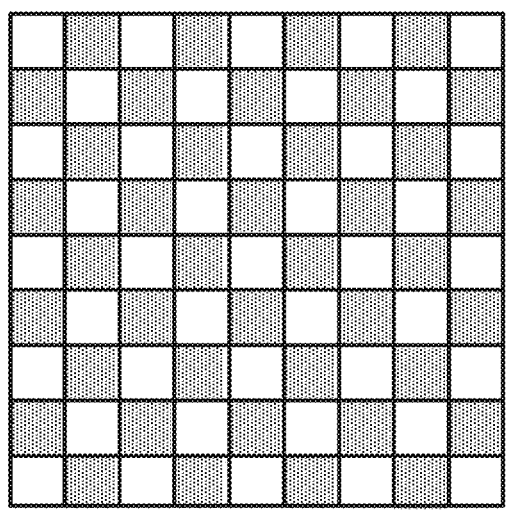
FIGS. 6A and 6B present schematic illustrations of bitmaps in embodiments of the invention in which a "side-by-side" printing protocol is employed. A bitmap suitable for the deposition of the first model formulation is illustrated in FIG. 6A and a bitmap suitable for the deposition of the second model formulation is illustrated in FIG. 6B. When the droplets of both formulations have the same or approximately the same weight, the bitmaps are useful for a 50:50 (or 1:1) w/w ratio. White boxes represent vacant locations, dotted boxes represent droplets of the first model formulation and wavy boxes represent droplets of the second model formulation. Each patterned (wavy/dotted) box represents a pixel (e.g., one formulation droplet). A drop of the first model formulation (dotted boxes) is deposited adjacent to a drop of the second model formulation (wavy boxes). Both model formulations may be deposited simultaneously during movement of the printing heads.
Figure 6B:
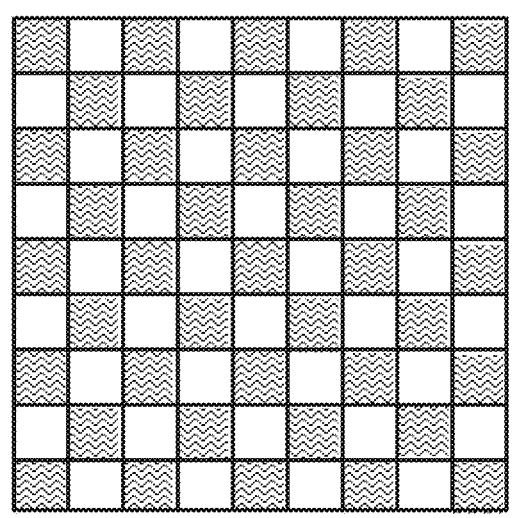

In some embodiments of the present invention a "side by side" printing protocol is employed. These embodiments are schematically illustrated in FIGS. 6A and 6B. A bitmap suitable for the deposition of the first modeling material formulation is illustrated in FIG. 6A and a bitmap suitable for the deposition of the second modeling material formulation is illustrated in FIG. 6B. The colors of the white, dotted and wavy boxes represent vacant locations, droplets of the first modeling material formulation and droplets of the second modeling material formulation, respectively. The printing data in these embodiments is such that for each layer, each drop of a first modeling material formulation is jetted adjacent to a drop of a second modeling material formulation, or vice versa. Due to drop spreading, the adjacent drops tend to partially overlap. As a result, the two drops diffuse toward each other, mix and interact after deposition.

In the schematic illustrations shown in FIGS. 5A-6B, chessboard bitmaps are illustrated, but this need not necessarily be the case, since for some applications, other bitmap patterns can be employed.

In some of any of the embodiments described herein, the building material further comprises one or more support material formulations.

In some of any of the embodiments described herein, dispensing a building material further comprises dispensing the support material formulation(s).

Dispensing the support material formulation, in some embodiments, is effected by inkjet printing head(s) other than the inkjet printing heads used for dispensing the modeling material formulation(s).

In some embodiments, exposing the building material to a condition that induces curing includes one or more conditions that affect curing of a support material formulation, to thereby obtain a cured support material.

In some of any of the embodiments described herein, once a building material is cured, the method further comprises removing the cured support material. Any of the methods usable for removing a support material formulation can be used, depending on the materials employed in the modeling material formulation and the support material formulation. Such methods include, for example, mechanical removal of the cured support material and/or chemical removal of the cured support material by contacting the cured support material with a solution in which it is dissolvable (e.g., an alkaline aqueous solution).

As used herein, the term "curing" describes a process in which a formulation is hardened. This term encompasses polymerization of monomer(s) and/or oligomer(s) and/or cross-linking of polymeric chains (either of a polymer present before curing or of a polymeric material formed in a polymerization of the monomers or oligomers). The product of a curing reaction is therefore typically a polymeric material and in some cases a cross-linked polymeric material. This term, as used herein, encompasses also partial curing, for example, curing of at least 20% or at least 30% or at least 40% or at least 50% or at least 60% or at least 70% of the formulation, as well as 100% of the formulation.

Herein, the phrase "a condition that affects curing" or "a condition for inducing curing", which is also referred to herein interchangeably as "curing condition" or "curing inducing condition" describes a condition which, when applied to a formulation that contains a curable material, induces polymerization of monomer(s) and/or oligomer(s) and/or cross-linking of polymeric chains. Such a condition can include, for example, application of a curing energy, as described hereinafter to the curable material(s), and/or contacting the curable material(s) (e.g., ROMP monomer) with chemically reactive components such as other components of a ROMP catalyst system, as described in further detail hereinafter.

In some embodiments, the curing condition comprises generating an active ROMP catalyst, e.g., activating a pre-catalyst by contacting it with a suitable activator), optionally in combination with application of a curing energy (e.g., heat).

When a condition that induces curing comprises application of a curing energy, the phrase "exposing to a condition that affects curing" means that the dispensed layers are exposed to the curing energy and the exposure is typically performed by applying a curing energy to the dispensed layers.

A "curing energy" typically includes application of radiation or application of heat.

The radiation can be electromagnetic radiation (e.g., ultraviolet or visible light), or electron beam radiation, or ultrasound radiation or microwave radiation, as also described hereinabove, depending on the materials to be cured. The application of radiation (or irradiation) is effected by a suitable radiation source. For example, an ultraviolet or visible or infrared or Xenon lamp can be employed, as described herein.

A curable material or system that undergoes curing upon exposure to radiation is referred to herein interchangeably as "photopolymerizable" or "photoactivatable" or "photocurable".

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is effected by irradiating the dispensed layers by heat-inducing radiation. Such irradiation can be effected, for example, by means of an IR lamp or Xenon lamp, operated to emit radiation onto the deposited layer.

In some embodiments, heating is effected by infrared radiation applied by a ceramic lamp, for example, a ceramic lamp that produces infrared radiation of from about 3 μm to about 6 μm or from about 3 μm to about 4 μm, e.g., about 3.5 μm.

In some embodiments, the heat-inducing radiation is selected to emit radiation at a wavelength that results in efficient absorption of the heat energy by a selected ROMP monomer or mixture of monomers, so as to effect efficient application of heat energy (efficient heating or thermal curing).

A curable material or system that undergoes curing upon exposure to heat is referred to herein as "thermally-curable" or "thermally-activatable" or "thermally-polymerizable".

In some of any of the embodiments described herein, the method further comprises exposing the cured modeling material formulation(s) either before or after removal of a support material formulation, if such has been included in the building material, to a post-treatment condition. The post-treatment condition, which is also referred to herein as post-curing treatment, is typically aimed at further hardening the cured modeling formulation(s) and/or at preventing its oxidation. In some embodiments, the post-curing treatment hardens a partially-cured formulation to thereby obtain a completely cured formulation.

In some embodiments, the post-curing treatment is effected by exposure to heat or radiation, preferably at a reduced pressure (vacuum), and optionally at atmospheric pressure under inert atmosphere, as described in any of the respective embodiments herein. In some embodiments, when the condition is heat, the post-curing treatment can be effected for a time period that ranges from a few minutes (e.g., 10 minutes) to a few hours (e.g., 1-24 hours). In some embodiments, the post-curing treatment is effected for 2 hours. In some embodiments, the post-curing treatment comprises heat, and heating is effected at a temperature that ranges from about 50° C. to about 250° C., or from about 50° C. to about 200° C., or from about 100° C. to about 200° C., or, for example, at 150° C., and at a reduced pressure.

An inert atmosphere can be, for example, nitrogen and/or argon atmosphere.

Reduced pressure can be, for example, lower than 200 mmHg, lower than 100 mmHg, or lower than 50 mmHg, for example, about 20 mmHg, although any other value is contemplated.

Alternatively, or in addition, the post-curing treatment comprises applying to a surface of (or coating) the model object, or to a part of the surface, a material or a composition that features anti-oxidation activity, to thereby reduce or prevent oxidation of the model object (or a part thereof) when exposed to ambient environment. In some of these embodiments, the material or composition is such that form a thin, preferably, but not necessarily transparent, layer on the surface of the model object or a part thereof. Any material or composition that feature anti-oxidation activity and which can be readily applied to the model object as described herein is contemplated. An exemplary such composition is an acrylic paint, that is, a formulation that forms an acrylic paint once deposited on a surface of the object.

Applying a material or composition featuring an anti-oxidation activity and exposing to heat or radiation, within a post-curing treatment as described herein, when used together, can be effected sequentially or simultaneously. For example, a formulation forming an acrylic paint can be applied to the surface of the model object, and exposure to heat and/or radiation can be applied thereafter, to thereby effect both formation of a layer of the acrylic paint and further hardening of the cured modeling formulation.

In some of any of the embodiments described herein, at least one of the modeling material formulations as described herein comprises a monomer that is polymerizable by ring opening metathesis polymerization (ROMP). Such a monomer is also referred to herein interchangeably as a ROMP monomer, a ROMP-polymerizable monomer, a ROMP curable monomer, a ROMP component, a ROMP active component, and similar diversions. In some embodiments, one or more of the modeling material formulations in the (uncured) building material comprises a catalyst for initiating a ROMP reaction of the monomer, as described in further detail hereinunder.

In some of any of the embodiments described herein, the ROMP monomer is an unsaturated cyclic monomer, preferably a strained unsaturated cyclic olefin, as described in further detail hereinunder.

In some of any of the embodiments described herein, exposing the modeling material formulation to a condition that induces curing comprises exposing the dispensed modeling material formulation(s) to a condition for inducing initiation of ROMP of the monomer by the catalyst, as described in further detail hereinunder. Any of the conditions for effecting curing as described hereinabove are contemplated, depending on the materials selected for the ROMP system.

Herein throughout, a condition for inducing initiation of ROMP of the monomer by the catalyst is also referred to herein interchangeably as "a ROMP inducing condition" or simply as "inducing condition", and describes a condition to which a modeling material formulation is exposed so as to effect ROMP of the ROMP monomer (e.g., to effect initiation of ROMP of the ROMP monomer by the catalyst).

A ROMP System:

Herein, a "ROMP system" describes a set of materials and optionally conditions for effecting polymerization, via a ROMP reaction, of an unsaturated cyclic ROMP monomer (or a mixture of ROMP monomers). The materials included in a ROMP system are also referred to herein as "ROMP components" or "ROMP active components".

A ROMP system requires at least a ROMP monomer and a catalyst for initiating the ROMP reaction. The catalyst is also referred to herein throughout as a "ROMP catalyst" or a "ROMP catalyst system".

ROMP catalysts can be divided into active catalysts and latent catalysts.

By "active catalyst" it is meant herein a catalyst which is active towards initiation of ROMP of the monomer immediately once it contacts the monomer, without a need to apply an external stimulus such as, for example, heat, radiation, or chemical additives.

By "active towards initiation of ROMP" of the monomer it is meant that in the presence of the catalyst, at least 50% or at least 60% or at least 70% or at least 80% of the monomer polymerizes via ROMP mechanism to provide a respective polymer.

An active catalyst is a ROMP catalyst that initiates ROMP of a monomer when in contact with the ROMP monomer, without requiring a stimulus. ROMP active catalysts are typically active at room temperature.

By "latent catalyst" it is meant herein a catalyst which is activatable only upon exposure to a condition. In such cases, the catalyst is inactive towards initiation of ROMP of the monomer when the ROMP system is not exposed to the condition that activates the catalyst, namely, prior to exposure to a ROMP inducing condition.

By "inactive towards initiation of ROMP" of the monomer it is meant that in the presence of the catalyst, no more than 40% or no more than 30% or no more than 20% or no more than 10% or no more than 5% of the monomer polymerizes via ROMP mechanism to provide a respective polymer.

A latent catalyst is a ROMP catalyst that initiates ROMP of a monomer when in contact with the ROMP monomer, upon exposure to an external stimulus, typically heat or radiation, or a chemical stimulus. A latent catalyst is inactive in initiating ROMP of a monomer in the absence of a suitable stimulus.

A latent catalyst typically includes a chelating (e.g., donor) ligand which "blocks" a coordinative site of the metal and thus renders the catalyst inactive. Activating the catalyst is effected by dissociating the chelating ligand from the metal center, to thereby render it active towards metathesis.

Latent catalysts can be thermally-activatable catalysts, which are converted into active catalysts upon exposure to heat; photo-activatable catalysts, which are converted into active catalysts upon exposure to radiation; or chemically-activatable, which are converted into active catalysts upon chemical activation by another chemical entity, known as an activator.

By "chemically activating" it is meant that the activation of a catalyst is made by an addition of a chemical entity (a chemical additive), e.g., a chemical compound or a chemical species such as an ion.

In such cases, the ROMP catalyst is inactive towards initiation of ROMP of the monomer, as defined herein, in the absence of the activator (when it is not contacted with the activator). A ROMP catalyst that is activatable in the presence of an activator is referred to herein also as a "pre-catalyst", and the activator is referred to herein as a "co-catalyst". A combination of pre-catalyst and an activator is also referred to herein and in the art as a catalyst system, and herein also as a ROMP catalyst system.

A pre-catalyst is typically inactive towards initiation of ROMP of the monomer, as defined herein, in the absence of a respective activator.

In such cases, a condition for initiating ROMP of a monomer requires a contact between the catalyst and the activator and the catalyst and the ROMP monomer.

A ROMP system in theses embodiments comprises, or consists of, a ROMP monomer, a ROMP catalyst and an activator, for chemically activating the ROMP catalyst.

The ROMP system can comprise an activator that is active towards chemically activating the pre-catalyst once it contacts the pre-catalyst, to thereby generate an active catalyst.

Alternatively, the activator can be an activatable activator, which is rendered active towards chemically activating the catalyst when exposed to a certain condition. In such cases, the activator is incapable of chemically activating the catalyst unless it is activated (by exposure to the condition). Such activators are also referred to herein as "latent activators".

A latent activator is incapable of activating a catalyst for initiating ROMP of the monomer, and can be converted to an active activator when exposed to an activating condition (which can be the ROMP inducing condition as described herein).

By "inactive towards chemically activating the catalyst" it is meant that no chemical reaction between the activator and the catalyst occurs, such that in the ROMP system containing the ROMP monomer, a ROMP catalyst which is chemically activatable by the activator, and the latent activator, no more than 40% or no more than 30% or no more than 20% or no more than 10% or no more than 5% of the monomer polymerizes via ROMP mechanism to provide a respective polymer.

By "active towards chemically activating the catalyst" it is meant that in a ROMP system containing the ROMP monomer, a ROMP catalyst which is chemically activatable by the activator, and the activator, at least 20% or at least 30% or at least 40% or at least 50% or at least 60% or at least 70% of the ROMP monomer polymerizes via ROMP mechanism to provide a respective polymer.

Latent activators can be thermally-activatable activators, which are converted into active activators upon exposure to heat (that is, a condition for inducing initiation of ROMP comprises heat or heating a ROMP system, optionally in addition to contacting an activator and a catalyst and a ROMP monomer).

Latent activators as described herein can be photo-activatable catalysts, which are converted into active activators upon exposure to radiation (that is, a condition for inducing initiation of ROMP comprises exposure to radiation or application of radiation to the ROMP system, optionally in addition to contacting an activator and a catalyst and a catalyst and a ROMP monomer). The radiation can be, for example, an electromagnetic radiation (e.g., UV or visible or IR light), or ultrasound radiation, and can be applied by a suitable source of the radiation.

In some of any of the embodiments described herein, a ROMP system can further comprise a ROMP inhibitor.

A "ROMP inhibitor" as used herein refers to a material that slows down a ROMP reaction initiated by a catalyst. ROMP inhibitors can be used with active catalysts, latent catalysts and pre-catalysts, as described herein. In some embodiments, a ROMP inhibitor inhibits a ROMP reaction initiated in the presence of an active catalyst, or once a latent catalyst or pre-catalyst is converted to an active catalyst, by interfering with the chemical reactions that activate a latent catalyst or a pre-catalyst.

It is to be noted that a ROMP system as described herein refers to the active components and/or conditions that together lead to ROMP polymerization of a ROMP monomer. A formulation that comprises a ROMP system can further comprise other components which can participate in polymerization or curing reactions (e.g., curable materials or systems), and/or form a part of the final polymeric material, as described in further detail hereinbelow.

In some of any of the embodiments described herein, a ROMP system comprises a ROMP monomer, a ROMP pre-catalyst and a ROMP activator, and optionally a ROMP inhibitor.

In some of any of the embodiments described herein the ROMP pre-catalyst is chemically-activatable by the activator, and in some embodiments, the ROMP pre-catalyst is an acid-activatable pre-catalyst.

In some of any of the embodiments described herein, the activator is active towards chemically activating the pre-catalyst (namely, it is an active activator), to thereby generate an active catalyst.

In some of any of the embodiments described herein, the pre-catalyst is an acid-activatable pre-catalyst and the activator is an acid and/or an acid generator, as described herein.

Herein throughout, whenever a ROMP monomer is indicated, it is to be understood as encompassing one or more (e.g., a mixture of two, three or more) ROMP monomer(s); whenever a ROMP pre-catalyst is indicated, it is to be understood as encompassing one or more (e.g., a mixture of two, three or more) pre-catalyst(s); whenever a ROMP activator is indicated, it is to be understood as encompassing one or more (e.g., a mixture of two, three or more) ROMP activator(s); and whenever a ROMP inhibitor is indicated, it is to be understood as encompassing one or more (e.g., a mixture of two, three or more) ROMP inhibitor(s).

Similarly, whenever reference to any other agent or moiety is made herein throughout, it is to be understood as encompassing one or more (e.g., a mixture of two, three or more) agent(s) or moiety/moieties.

ROMP Monomers:

A ROMP monomer as described herein describes any material that undergoes ROMP in the presence of a ROMP catalyst or ROMP catalyst system.

Typically ROMP monomers are unsaturated cyclic compounds (cyclic olefins), and preferably strained unsaturated cyclic compounds (strained cyclic olefins).

Any compound that can undergo ROMP is encompassed by the present embodiments.

The phrase "ROMP monomer" as used herein encompasses one ROMP monomer or a combination of ROMP monomers, and also encompasses a mixture of a ROMP monomer with another cyclic olefin that can react with a ROMP monomer during ROMP of the ROMP monomer, if included in the same reaction mixture. Such cyclic olefins can be recognized by those skilled in the art.

Exemplary ROMP monomers include, but are not limited to dicyclopentadiene (DCPD), cyclopentadiene trimer, tetramer, pentamer, etc., norbornene, cyclooctene, cyclooctadiene, cyclobutene, cyclopropene and substituted derivatives thereof, for example, substituted norbornenes such as carboxylated norbornenes, butyl norbornene, hexyl norbornene, octyl norbornene.

Any cyclic olefin (unsaturated cyclic compounds) suitable for the metathesis reactions disclosed herein may be used.

Herein, the phrases "cyclic olefin" and "unsaturated cyclic compound" are used interchangeably encompasses compounds comprising one, two, three or more non-aromatic rings (fused and/or unfused rings) which comprise at least one pair of adjacent carbon atoms in the ring which are bound to one another by an unsaturated bond. The ring may optionally be substituted or unsubstituted, and the cyclic olefin may optionally comprise one unsaturated bond ("monounsaturated"), two unsaturated bonds ("di-unsaturated"), three unsaturated bond ("tri-unsaturated"), or more than three unsaturated bonds. When substituted, any number of substituents may be present (optionally from 1 to 5, and optionally 2, 3, 4 or 5 substituents), and the substituent(s) may optionally be any substituent describes herein as being optionally attached to an alkyl or alkenyl.

Examples of cyclic olefins include, without limitation, cyclooctene, cyclododecene, and (c,t,t)-1,5,9-cyclododecatriene.

Examples of cyclic olefins with more than one ring include, without limitation, norbornene, dicyclopentadiene, tricyclopentadiene, and 5-ethylidene-2-norbornene.

The cyclic olefin may be a strained or unstrained cyclic olefin, provided the cyclic olefin is able to participate in a ROMP reaction either individually or as part of a ROMP cyclic olefin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a co-monomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In some embodiments of any one of the embodiments described herein, the substituted or unsubstituted cyclic olefin comprises from 5 to 24 carbon atoms. In some such embodiments, the cyclic olefin is a hydrocarbon devoid of heteroatoms. In alternative embodiments, the cyclic olefin comprises one or more (e.g., from 2 to 12) heteroatoms such as O, N, S, or P, for example, crown ether cyclic olefins which include numerous O heteroatoms throughout the cycle, are within the scope of the invention.

In some embodiments of any one of the embodiments described herein relating to a cyclic olefin comprising from 5 to 24 carbon atoms, the cyclic olefin is mono-unsaturated, di-unsaturated, or tri-unsaturated.

In some embodiments of any of the embodiments described herein, the cyclic olefin has the general formula (A):

Formula (A)

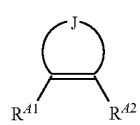

wherein:

$R^{41}$ and $R^{42}$ are each independently hydrogen, alkyl, cycloalkyl, alkenyl, alkynyl, aryl, heteroaryl, heteroalicyclic, halo, hydroxy, alkoxy, aryloxy, thiohydroxy, thioalkoxy, thioaryloxy, sulfinyl, sulfonyl, sulfonate, nitrile, nitro, azide, phosphonyl, phosphinyl, oxo, carbonyl, thiocarbonyl, urea, thiourea, carbamyl, N-carbamyl, O-thiocarbamyl, N-thiocarbamyl, C-amido, N-amido, C-carboxy, O-carboxy, sulfonamido, and amino;

J is a saturated or unsaturated hydrocarbon, which may be substituted or unsubstituted, and may optionally comprise one or more heteroatoms between the carbon atoms thereof. Additionally, two or more substituents attached to ring atoms within J may optionally be linked to form a bicyclic or polycyclic olefin.

In some embodiments of any of the respective embodiments described herein, the compound of formula (A) contains from 5 to 14 ring atoms, optionally from 5 to 8 ring atoms, for a monocyclic olefin; and, for bicyclic and polycyclic olefins, from 4 to 8 ring atoms in each ring, optionally from 5 to 7 ring atoms in each ring.

In some embodiments of any of the embodiments described herein, the cyclic olefin has the general formula (B):

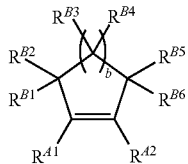

Formula (B)

wherein:

b is an integer in a range of 1 to 10, optionally 1 to 5;

$R^{A1}$ and $R^{A2}$ are as defined above for formula (A); and $R^{B1}$, $R^{B2}$, $R^{B3}$, $R^{B4}$, $R^{B5}$, and $R^{B6}$ are each independently hydrogen, alkyl, cycloalkyl, alkenyl, alkynyl, aryl, heteroaryl, heteroalicyclic, halo, hydroxy, alkoxy, aryloxy, thiohydroxy, thioalkoxy, thioaryloxy, sulfinyl, sulfonyl, sulfonate, nitrile, nitro, azide, phosphonyl, phosphinyl, oxo, carbonyl, thiocarbonyl, urea, thiourea, carbamyl, N-carbamyl, O-thiocarbamyl, N-thiocarbamyl, C-amido, N-amido, C-carboxy, O-carboxy, sulfonamido, and amino, or alternatively, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, and $R^{B6}$ moieties to provide a substituted or unsubstituted 4- to 7-membered ring;

In some embodiments of any of the embodiments described herein, the cyclic olefin is monocyclic.

In some embodiments of any of the embodiments described herein, the cyclic olefin is monounsaturated, optionally being both monocyclic and monounsaturated.

Examples of monounsaturated, monocyclic olefins encompassed by formula (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as methylcyclopentene (e.g., 1-methylcyclopentene, 4-methylcyclopentene), ethylcyclopentene (e.g., 1-ethylcyclopentene), isopropylcyclohexene (e.g., 1-isopropylcyclohexene), chloropentene (e.g., 1-chloropentene), fluorocyclopentene (e.g. 1-fluorocyclopentene), methoxycyclopentene (e.g., 4-methoxy-cyclopentene), ethoxycyclopentene (e.g., 4-ethoxy-cyclopentene), cyclopentene-thiol (e.g., cyclopent-3-ene-thiol), methylsulfanyl-cyclopentene (e.g., 4-methylsulfanyl-cyclopentene), methylcyclohexene (e.g., 3-methylcyclohexene), methylcyclooctene (e.g., 1-methylcyclooctene), and dimethylcyclooctene (e.g., 1,5-dimethylcyclooctene).

In some embodiments of any of the embodiments described herein, the cyclic olefin is diunsaturated, optionally being both monocyclic and diunsaturated.

In some embodiments, the cyclic olefin has the general formula (C):

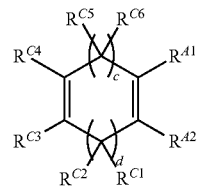

Formula (C)

wherein c and d are each independently integers in the range of from 1 to 8, optionally from 2 to 4, and optionally 2 (such that the cyclic olefin is a cyclooctadiene);

$R^{A1}$ and $R^{A2}$ are as defined above for formula (A); and $R^{C1}$, $R^{C2}$, $R^{C3}$, $R^{C4}$, $R^{C5}$, and $R^{C6}$ are each independently defined as for $R^{B1}$-$R^{B6}$.

In some embodiments, $R^{c3}$ and $R^{C4}$ are substituents (i.e., not hydrogen), in which case at least one of the olefinic moieties is tetrasubstituted.

Examples of diunsaturated, monocyclic olefins include, without limitation, 1,3-cyclopentadiene, 1,3-cyclohexadiene, 1,4-cyclohexadiene, heptadiene (e.g., 1,3-cycloheptadiene), octadiene (e.g., 1,5-cyclooctadiene, 1,3-cyclooctadiene), and substituted versions thereof (e.g., 5-ethyl-1,3-cyclohexadiene).

In some embodiments of any of the embodiments described herein, the cyclic olefin comprises more than two (optionally three) unsaturated bonds. In some embodiments, such compounds are analogous to the diene structure of formula (C), comprising at least one methylene linkage (analogous to the number of methylene linkages indicated by the variables c and d in formula (C)) between any two olefinic segments.

In some embodiments of any of the embodiments described herein, the cyclic olefin is polycyclic.

Herein, the term "polycyclic" refers to a structure comprising two or more fused rings.

In some embodiments of any of the embodiments described herein, the cyclic olefin is a polycyclic olefin having the general formula (D):

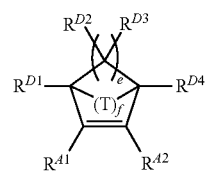

Formula (D)

wherein:

$R^{A1}$ and $R^{A2}$ are each independently as defined above for formula (A):

$R^{D1}$, $R^{D2}$, $R^{D3}$ and $R^{D4}$ are each independently as defined for $R^{B1}$-$R^{B6}$;

e is an integer in the range of from 1 to 8, optionally from 2 to 4:

f is 1 or 2; and

T is a substituted or unsubstituted saturated or unsaturated hydrocarbon of 1-4 carbon atoms in length (optionally 1 or 2 carbon atoms in length, for example, substituted or unsubstituted methyl or ethyl), O, S, N($R^{G1}$), P($R^{G1}$), P(=O)

($R^{G1}$), $Si(R^{G1})_2$, $B(R^{G1})$, or $As(R^{G1})$, wherein $R^{G1}$ is alkyl, alkenyl, alkynyl, cycloalkyl, heteroalicyclic, aryl, heteroaryl, alkoxy or aryloxy.

Cyclic olefins encompassed by formula (D) are examples of compounds in the norbornene family.

As used herein, the term "norbornene" refers to any compound that includes at least one substituted or unsubstituted bicyclo[2.2.1]hept-2-ene moiety or dehydrogenated derivative thereof, including without limitation, bicyclo [2.2.1]hept-2-ene (referred to in the art as "norbornene") and substituted versions thereof, norbornadiene, (bicyclo[2.2.1] hepta-2,5-diene) and substituted versions thereof, and polycyclic norbornenes, and substituted versions thereof.

In some embodiments, the cyclic olefin is a polycyclic norbornene having the general formula (E):

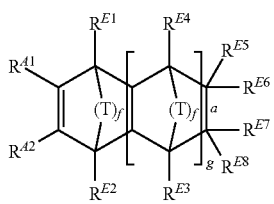

Formula (E)

wherein:

$R^{A1}$ and $R^{A2}$ are each independently as defined above for formula (A);

T is as defined above for formula (D);

$R^{E1}$, $R^{E2}$, $R^{E3}$, $R^{E4}$, $R^{E5}$, $R^{E6}$, $R^{E7}$, and $R^{E8}$ are each independently as defined for $R^{B1}$-$R^{B6}$; and "a" represents a saturated bond or unsaturated double bond, wherein when "a" is an unsaturated double bond, one of $R^{E5}$, $R^{E6}$ and one of $R^{E7}$, $R^{E8}$ is absent;

f is 1 or 2; and g is an integer from 0 to 5.

In some embodiments, the cyclic olefin has the general formula (F):

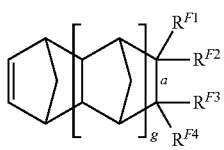

Formula (F)

wherein:

$R^{F1}$, $R^{F2}$, $R^{F3}$ and $R^{F4}$ defined above for $R^{E4}$, $R^{E5}$, $R^{E6}$, $R^{E7}$, and $R^{E8}$ respectively; and a and g are as defined in formula (E) hereinabove.

Examples of bicyclic and polycyclic olefins include, without limitation, dicyclopentadiene (DCPD); trimer and higher order oligomers of cyclopentadiene (e.g. cyclopentadiene tetramer, cyclopentadiene pentamer); ethylidenenorbornene; dicyclohexadiene; norbornene; 5-methyl-2-norbornene; 5-ethyl-2-norbornene: 5-isobutyl-2-norbornene; 5,6-dimethyl-2-norbornene; 5-phenylnorbornene; 5-benzylnorbornene; 5-acetylnorbornene: 5-methoxycarbonylnorbornene; 5-ethyoxycarbonyl-1-norbornene; 5-methyl-5-methoxy-carbonylnorbornene; 5-cyanonorbornene; 5,5,6-trimethyl-2-norbornene; cyclo-hexenylnorbornene; endo,exo-5,6-dimethoxynorbornene; endo,endo-5,6-dimethoxynorbornene; endo,exo-5,6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene: 8-cyanotetracyclododecene; pentacyclopentadecene; pentacyclohexadecene; and the like, and their structural isomers, stereoisomers, and mixtures thereof.

Additional examples of bicyclic and polycyclic olefins include, without limitation, $C_2$-$C_{12}$-alkyl-substituted and $C_2$-$C_{12}$-alkenyl-substituted norbornenes, for example, 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like.

In some embodiments of any of the embodiments described herein, the cyclic olefin is dicyclopentadiene: tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene: 5-benzylnorbornene: 5-acetylnorbornene: 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo,exo-5,6-dimethoxynorbornene; endo,endo-5,6-dimethoxynorbornene; endo,exo-5-6-dimethoxycarbonylnorbornene: endo,endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene: 8-methyl-8-tetracyclo-dodecene; 8-cyanotetracyclododecene; pentacyclopentadecene; pentacyclohexadecene; an oligomer of cyclopentadiene (e.g., cyclopentadiene tetramer, cyclopentadiene pentamer); and/or a $C_2$-$C_{12}$-alkyl-substituted norbornene or $C_2$-$C_{12}$-alkenyl-substituted norbornene (e.g., 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; 5-butenyl-2-norbornene).

In some embodiments of any of the embodiments described herein, the cyclic olefin is dicyclopentadiene, tricyclopentadiene, or higher order oligomer of cyclopentadiene (e.g., cyclopentadiene tetramer, cyclopentadiene pentamer), tetracyclododecene, norbornene, and/or a $C_2$-$C_{12}$-alkyl-substituted norbornene or $C_2$-$C_{12}$-alkenyl-substituted norbornene (e.g., according to any of the respective embodiments described herein).

Additional examples for ROMP capable cyclic olefin monomers which may be optionally used in embodiments of the invention include any polycyclic compounds which are characterized by the presence of at least two norbornene moieties in its structure, for example:

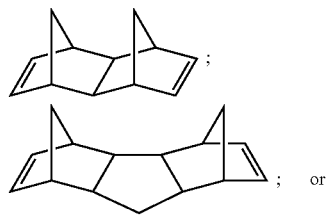

-continued

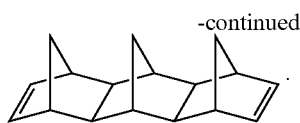

In some embodiments of any of the embodiments described herein, the cyclic olefin is characterized by the presence of at least three rings.

In some embodiments of any of the embodiments described herein relating to a norbornene-based monomer, a monocyclic olefin (e.g., cyclobutene, cyclopentene, cyclopentadiene, cyclooctene, cyclododecene) is copolymerized with the norbornene-based monomer.

Without being bound by any particular theory, it is believed that polycyclic monomers with a rigid backbone, such as cyclopentadiene trimer (TCPD or CPD trimer) will typically produce a cross-linked polymer with very high Tg and heat deflection temperature (HDT), but will also be more brittle and may have lower Impact resistance.

In some embodiments of any of the embodiments described herein, a polycyclic monomer with a rigid backbone (e.g., according to any of the respective embodiments described herein) is formulated with one or more softer additional monomers and/or cross linkers.

Examples of additional monomers include, without limitation, monomers having the formula:

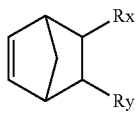

wherein Rx and Ry are each independently hydrogen, $C_1$-$C_{20}$-alkyl, cycloalkyl, heteroalicyclic, aryl, polyethylene glycol, polypropylene glycol or benzyl.

Example of bifunctional cyclic olefins, which may also act as cross linkers include, without limitation, compounds having any one of the following formulas:

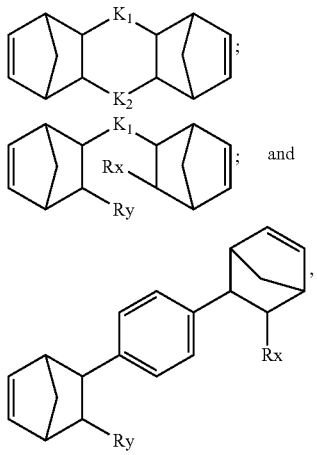

wherein Rx and Ry are each independently hydrogen, $C_1$-$C_{20}$-alkyl, cycloalkyl, heteroalicyclic, aryl, polyethylene glycol, polypropylene glycol or benzyl; and $K_1$ and $K_2$ are each independently $C_1$-$C_{20}$-alkylene, cycloalkyl, heteroalicyclic, aryl, polyethylene glycol, polypropylene glycol or benzyl.

Additional examples of bifunctional cyclic olefins include, without limitation:

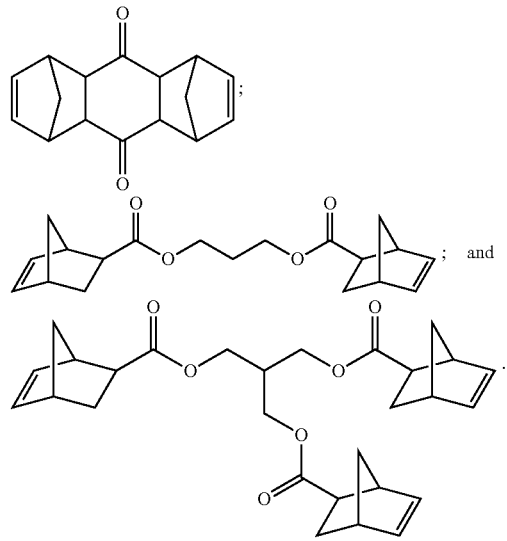

The connection between an additional monomer and/or bifunctional monomer (cross-linker) to a polycyclic (e.g., norbornene) monomer may optionally be, without limitation, through a saturated or unsaturated carbon-carbon bond, an ester bond, and ether bond, an amine, or an amide bond.

Synthesis of norbornene derivatives described herein according to any of the respective embodiments may optionally be performed by Diels-Alder reaction of double bond with cyclopentadiene (CPD), as depicted in Scheme 1 below:

Scheme 1

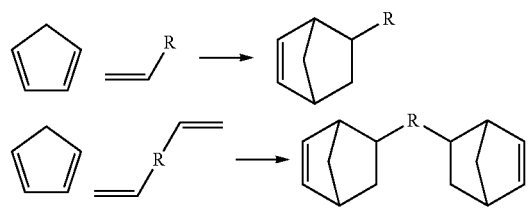

Substituents of a polymerized cyclic olefin may optionally be in a protected form in the monomer. For example, hydroxy groups, which may interfere with metathesis catalysis, may be protected by being in a form of any suitable protected group used in the art. Acceptable protecting groups may be found, for example, in Greene et al., Protective Groups in Organic Synthesis, 3rd Ed. (New York: Wiley, 1999).

Table A below presents non-limiting examples of suitable ROMP polymerizable monomers according to some embodiments of the present invention.

In a preferred embodiment, the ROMP monomer is or comprises DCPD due to its high reactivity, and the high thermal resistance and toughness properties exhibited by a printed object made therefrom.

In a preferred embodiment, the ROMP monomer is or comprises a CPD trimer due to its suitable viscosity and the high thermal resistance exhibited by a printed object made therefrom.

In a preferred embodiment, a ROMP monomer is or comprises a mixture of DCPD and CPD trimer, for example, a mixture known in the art, and also referred to herein as "RIM monomer". In some embodiments, such a mixture comprises DCPD at a concentration ranging from about 70% to about 99%, or from 85% to about 95%, by weight, of the total weight of a ROMP monomer, and a CPD trimer at a concentration ranging from about 30% to about 1%, or from about 15% to about 5%, respectively, by weight, of the total weight of a ROMP monomer.

In a commercially available "RIM monomer", a concentration of DCPD is typically from about 90% to about 92%.

In some embodiments, a ROMP monomer is or comprises about 91% DCPD and about 9% CPD trimer, as described herein.

TABLE A

| Tradename | Structure | Supplier |
| --- | --- | --- |
| DCPD | Dicyclopentadiene | Telene SAS |
| RIM monomer | Cyclopentadiene trimer in dicyclopentadiene | Telene SAS |
| Cyclopentadiene trimer | Cyclopentadiene trimer | Zeon |
| Cyclooctene | Cyclooctene | Sigma Aldrich |
| Cyclooctadiene | Cyclooctadiene | Sigma Aldrich |
| Norbornene | Norbornene | Sigma Aldrich |
| ENB | 5-Ethylidene-2-norbornene | Sigma Aldrich |
| cyclododecatriene | cyclododecatriene | BASF |

ROMP Catalysts and Catalyst Systems:

In some of any of the embodiments described herein, the ROMP catalyst system comprises an acid-activatable ROMP pre-catalyst and an activator that is active towards chemically activating the pre-catalyst. In some embodiments, the activator is an acid, as described herein, and in some embodiments, the activator is capable of generating an acid.

ROMP catalysts typically include metal carbene organometallic complexes, with the metal being typically, but not necessarily, a transition metal such as ruthenium, molybdenum, osmium or tungsten.

Ruthenium based ROMP catalysts are more stable on exposure to non carbon-carbon double-bond functional groups, and to other impurities like water and oxygen. These catalysts can typically be used in low loading in the formulation (e.g., in a range of from about 0.002% to about 0.05% by weight of the total weight of a modeling material formulation containing same).

A ROMP pre-catalyst is a ROMP catalyst that initiates ROMP of a monomer when in contact with the ROMP monomer, upon exposure to a chemical stimulus, as described herein, typically a presence of an acid or a proton, which converts the pre-catalyst to an active catalyst (which induces ROMP of a ROMP monomer when in contact with the ROMP monomer). A pre-catalyst is inactive in initiating ROMP of a monomer in the absence of the chemical stimulus.

A pre-catalyst typically includes a chelating (e.g., donor) ligand which "blocks" a coordinative site of the metal and thus renders the catalyst inactive. Activating the catalyst is effected by dissociating the chelating ligand from the metal center, to thereby render it active towards metathesis.

In a pre-catalyst, dissociating the chelating ligand requires a chemical stimulus, typically a presence of an acid. The agent that exerts a chemical stimulus that activates the catalyst is referred to herein as an activator or a co-catalyst.

A ROMP pre-catalyst and a suitable activator form together a catalyst system.

In some of any of the embodiments described herein, the pre-catalyst is an acid-activatable pre-catalyst, particularly a Ruthenium (Ru) based acid-activatable pre-catalyst.

In some of any of the embodiments described herein, the Ru-based catalyst bears one or more bidentate Schiff base ligands.

Exemplary such Schiff-base ligands are described, for example, in EP Patent No. 1468004, which is incorporated by reference as if fully set forth herein.

In some embodiments, the bidentate Schiff base ligand is derived from a salicyldiamine derivative, as described, for example, in EP Patent Application Nos. 8290747 and 8290748, and in US Patent Application Publication No. 2012/0271019, which are incorporated by reference as if fully set forth herein.

In some embodiments, the pre-catalyst is represented by the general Formula I:

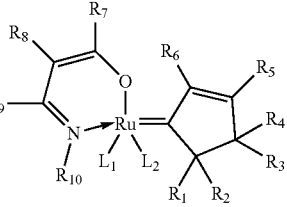

Formula I wherein:

$L_1$ and $L_2$ are each independently common ligands of ruthenium-based catalysts for ROMP, including, for example, carbene ligands and halogen ligands, as described in further detail hereinbelow, or, alternatively, one of $L_1$ and $L_2$ is a bidentate Schiff base ligand, as described herein:

$R_1$, $R_2$, $R_3$, $R_4$, $R_5$ and $R_6$ are each independently selected from the group consisting of hydrogen, halogen, alkyl, alkenyl, alkynyl, aryl, heteroalkyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is absent or is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is any one or more of the $R_1$, $R_2$, $R_3$, $R_4$, $R_5$ and $R_6$ which may be linked together to form a cyclic group;

$R_7$, $R_8$, $R_9$ and $R_{10}$ are each independently selected from the group consisting of hydrogen, halogen, alkyl, alkenyl, alkynyl, aryl, heteroalkyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, and borate, or, alternatively, two of $R_7$-$R_{10}$ form together a cyclic ring.

Herein, a "cyclic ring" can be an alicyclic (e.g., cycloalkyl), heteroalicyclic, aromatic (aryl) or heteroaromatic (heteroaryl) ring, as these terms are defined herein.

In some of any of the embodiments of Formula I herein, $R_1$, $R_2$, $R_3$ and $R_4$ form together a cyclic ring, and in some embodiments, the cyclic ring is an aromatic ring (an aryl). In some embodiments, $R_1$, $R_2$, $R_3$ and $R_4$ form together a phenyl, which can be substituted or unsubstituted. In some embodiments, the phenyl is unsubstituted.

In some of any of the embodiments of Formula I herein, $R_5$ is an aryl (e.g., phenyl, for example, an unsubstituted phenyl).

In some of any of the embodiments of Formula I herein. $R_{10}$ is an aryl, and in some embodiments, it is phenyl which can be substituted or unsubstituted. In some embodiments, the phenyl is substituted, and in some embodiments, it is substituted by an alkyl (e.g., linear or branched, primary, secondary or tertiary alkyl).

In some of any of the embodiments of Formula I herein, two of $R_7$, $R_8$ and $R_9$ form a cyclic ring, and in some of these embodiments, the cyclic ring is an aromatic ring (e.g., an aryl such as phenyl). In some of these embodiments, the aromatic ring is phenyl, which can be substituted or unsubstituted. In some embodiments, the phenyl is substituted, for example, by alkoxy.

In some of any of the embodiments herein, at least one of $L_1$ and $L_2$ is a nucleophilic carbene ligand, and in some embodiments, the carbene ligand is represented by the Formula:

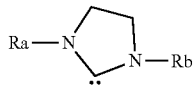

wherein Ra and Rb are each independently aryl, cycloalkyl or aryl (e.g., phenyl).

In some embodiments, each of Ra and Rb is an aryl, and in some embodiments, each is phenyl. In some embodiments, the phenyl is substituted, and in some embodiments. Ra and Rb are both mesitylene (2,4,6-trimethylphenyl).

Other nucleophilic carbene ligands are contemplated, for example, any of those described in U.S. Patent Application having Publication No. 2012/0271019.

In some embodiments, one of $L_1$ and $L_2$ is halogen.

In some embodiments. $L_1$ is a nucleophilic carbene ligand and $L_2$ is halogen. In these embodiments, the Ru-based pre-catalyst bears one bidentate Schiff base ligand.

Exemplary such pre-catalysts can be represented by Formula II:

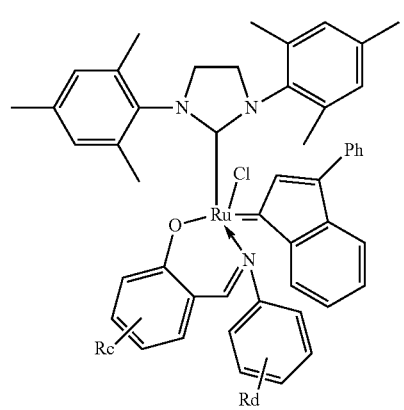

wherein Rc and Rd each independently represent one or more substituents which are each independently as defined herein for $R_7$-$R_9$.

In some embodiments, Rc and Rd can each be independently alkyl, alkenyl, alkynyl, alkoxy, aryl, aryloxy, carboxylate, thioalkoxy and thioaryloxy.

An exemplary such catalyst is VC 834 (see. Table B).

In some embodiments, one of $L_1$ and $L_2$ is a bidentate Schiff base ligand such that the pre-catalyst bears two bidentate Schiff base ligands.

The two Schiff-base ligands can be the same or different.

In some embodiments, the second Schiff base ligand is derived from a salicyldiamine derivative, as described, for example, in EP Patent Application Nos. 8290747 and 8290748, and in US Patent Application Publication No. 2012/0271019, which are incorporated by reference as if fully set forth herein.

In some embodiments, the pre-catalyst is represented by the general Formula I as described herein, wherein $L_1$ is a nucleophilic carbene ligand as defined herein and $L_2$ is a Schiff base ligand as defined herein.

In some embodiments, the pre-catalyst is represented by the Formula III:

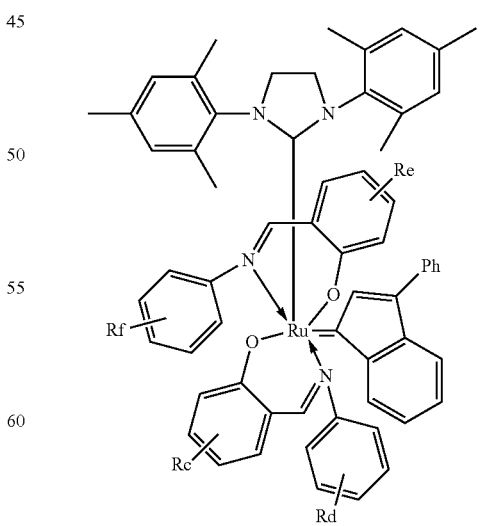

wherein Rc and Rd are as defined herein, and Re and Rf are as defined herein for Rc and Rd.

Exemplary such pre-catalysts, marketed by Telene SAS, are presented in Table B.
TABLE B
Structure (Tradename)
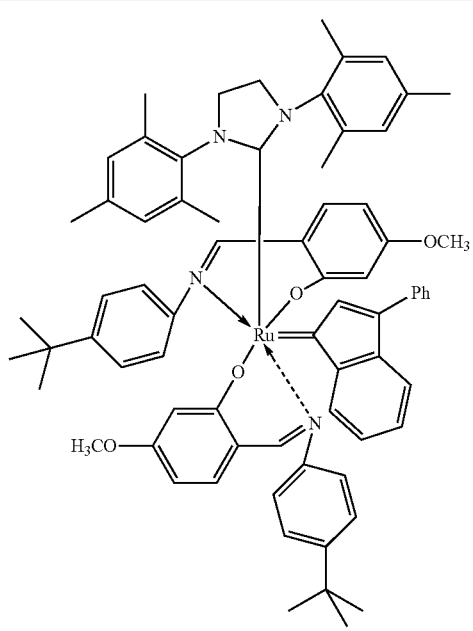
(VC1161)
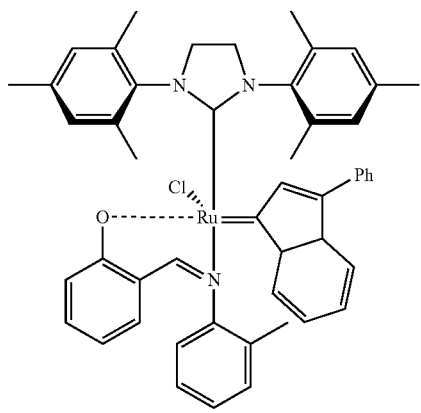
(VC843)
TABLE B-continued
Structure (Tradename)
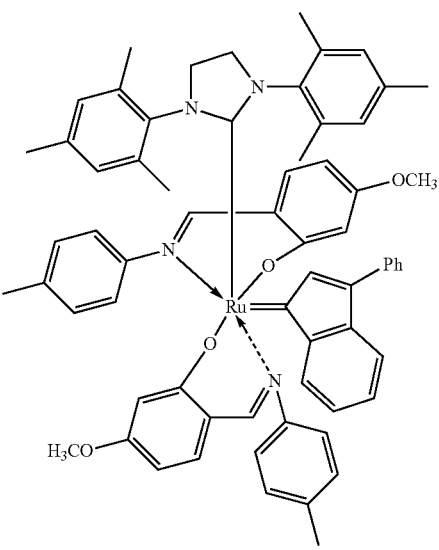
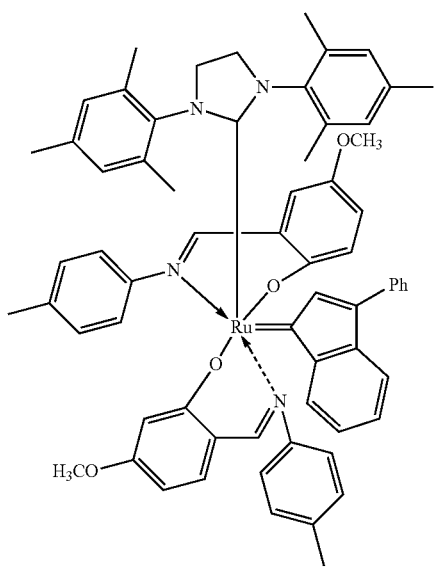

TABLE B-continued

Structure (Tradename)

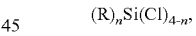

In some of any of the embodiments described herein, the pre-catalyst comprises at least two acid-activatable Ru-based pre-catalysts.

In some of any of the embodiments described herein, the pre-catalyst comprises at least two catalysts represented by the Formula I as described herein in any of the respective embodiments.

In some of any of the embodiments described herein, the pre-catalyst comprises at least two acid-activatable Ru-based pre-catalysts, wherein one of the pre-catalysts comprises one bidentate Schiff-base ligand, as described herein, and one of the pre-catalysts comprises two bidentate Schiff base ligands, as described herein.

In some of any of the embodiments described herein, the pre-catalyst comprises at least two catalysts represented by the Formula I as described herein in any of the respective embodiments, wherein for one of the pre-catalysts $L_1$ and $L_2$ are independently selected from a nucleophilic carbene ligand and halogen, and in another pre-catalyst, one of $L_1$ and $L_2$ is a bidentate Schiff base ligand as described herein.

In some embodiments, the pre-catalyst comprises a mixture of a pre-catalyst represented by Formula II and a pre-catalyst represented by Formula III.

Whenever a mixture of pre-catalysts is used as a pre-catalyst of the present embodiments, a ratio between the pre-catalysts can range from 90:10 to 10:90, or from 80:20 to 20:80, or from 73:30 to 30:70, or from 60:40 to 40:60, or is 50:50.

In some embodiments, a ratio between a pre-catalyst having one bidentate Schiff base ligand and a pre-catalyst having two bidentate Schiff base ligands (e.g., a pre-catalyst of Formula I in which $L_1$ and $L_2$ are independently selected from a nucleophilic carbene ligand and halogen, and a pre-catalyst of Formula I in which one of $L_1$ and $L_2$ is a bidentate Schiff base ligand as described herein; or pre-catalyst of Formula II and a pre-catalyst of Formula III) ranges from 90:10 to 10:90, or from 80:20 to 20:80, or from 73:30 to 30:70, or from 60:40 to 40:60, or is 50:50. In some of these embodiments, the ratio is 60:40.

In some of any of the embodiments described herein the catalyst system used in the modeling material formulations described herein comprises a mixture of a pre-catalyst of Formula II and a pre-catalyst of Formula III, and in some embodiments, a mixture of VC834 and VC1161, and in some of these embodiments, the ratio between the pre-catalysts ranges from 90:10 to 10:90, or from 80:20 to 20:80, or from 73:30 to 30:70, or from 60:40 to 40:60, or is 50:50. In some of these embodiments, the ratio is 60:40 (VC834:VC5761). In some of these embodiments, the ratio is 40:60 (VC834:VC1161). In some of these embodiments, the ratio is 20:80 (VC834:VC1161).

Activators suitable for use with the Ru-based acid-activatable pre-catalysts described herein include acids, such as, for example, inorganic acids (e.g., HCl), organic acids such as, for example, acetic acid, propionic acid, and Lewis-Bronsted acids such as, for example, organochlorosilanes.

In some embodiments, the activator is an organochlorosilane, which can be selected from those represented by the Formula:

$$(R)_nSi(Cl)_{4-n},$$

wherein R can be hydrogen, alkyl, cycloalkyl or aryl, and includes at least one of alkyl, cycloalkyl or aryl, each of the alkyl, cycloalkyl and aryl being optionally substituted, and n is 1, 2, or 3.

When n is 2 or 3, the "R" groups can be the same or different.

In some of any of the embodiments described herein, the alkyl can be linear or branched, preferably linear, substituted or unsubstituted, as defined herein, and can be of 1 to 30 carbon atoms, or from 1 to 20 carbon atoms.

In some embodiments, n is 1 and R is an aryl, for example, phenyl.

In some embodiments, n is 1 and R is an alkyl, for example, an unsubstituted alkyl. In some of these embodiments, n is 1 and R is an alkyl of 2 or more, preferably 3 or more, preferably 4 or more carbon atoms in length. In some of these embodiments, the alkyl is of from 4 to 30, or from 4 to 20, or from 6 to 20, or from 8 to 20 carbon atoms in length. In a preferred embodiment, n is 1 and R is an unsubstituted alkyl of 10 carbon atoms in length.

The alkyl is preferably linear but can also be a branched alkyl.

Optionally, n is 1 and R is a substituted alkyl as described herein, of, for example, from 4 to 30, or from 4 to 20, or from 6 to 20, or from 8 to 20 carbon atoms in length.

In some of these embodiments, the alkyl is substituted by one or more halo atoms, for example, chloro or fluoro atoms. In some of these embodiments, the alkyl is fully substituted (all hydrogen atoms are substituted) by halo atoms, for example, fluoro atoms.

In some embodiments, n is 2, and each of the "R" groups is independently an aryl, for example, phenyl. In some embodiments, the aryl (e.g., phenyl) is unsubstituted.

In some embodiments, n is 2, one of the "R" groups is an aryl, for example, phenyl, and the other "R" group is hydrogen or alkyl. In some embodiments, the aryl (e.g., phenyl) is unsubstituted. In some embodiments the alkyl, if present, is a short alkyl, of 1 to 4 carbon atoms in length (e.g., methyl). In some embodiments, the alkyl is unsubstituted.

In some embodiments, n is 3, and at least one of the three "R" groups is aryl and alkyl. In some of these embodiments, one of the R groups is aryl (e.g., phenyl) and the to other two R groups are independently an alkyl (e.g., methyl). The alkyl is preferably a short alkyl of 1 to 4 carbon atoms in length. In some of these embodiments, one of the R groups is aryl (e.g., phenyl), and the other two R groups are hydrogen. In some of any of these embodiments, the aryl and/or the alkyl is unsubstituted. In some of any of these embodiments, the alkyl is a linear alkyl.

In some embodiments, n is 3 and each of the three "R" groups is independently an alkyl.

In some of these embodiments, each of the R groups is an alkyl of 1 to 4 carbon atoms in length. In some of these embodiments, one or more of the R groups is an unsubstituted methyl. In some of these embodiments, each of the three R groups is an unsubstituted methyl. In some of these embodiments, two of the R groups are each an unsubstituted methyl, and one of the R groups is a substituted methyl. The methyl can be substituted by, for example, one or more halo atoms, for example, one or two chloro or fluoro atoms.

In some embodiments, n is 3, two of the R groups are each a methyl (e.g. unsubstituted methyl), and one of the R groups is an alkyl of at least 4 carbon atoms in length. In some of these embodiments, the alkyl is of from 4 to 30, or from 4 to 20, or from 6 to 20, or from 8 to 20 carbon atoms in length.

The alkyl is preferably linear but can also be a branched alkyl.

Optionally, n is 3, two of the R groups are each a methyl (e.g., unsubstituted methyl), and one of the R groups is a substituted alkyl as described herein, of, for example, from 4 to 30, or from 4 to 20, or from 6 to 20, or from 8 to 20 carbon atoms in length. In some of these embodiments, the alkyl is substituted by one or more halo atoms, for example, chloro or fluoro atoms. In some of this embodiments, the alkyl is fully substituted (all hydrogen atoms are substituted) by halo atoms, for example, fluoro atoms.

Exemplary activators suitable for use in combination with the pre-catalysts described herein are presented in Table C below.

TABLE C

| Tradename | Structure | Supplier | |
|---|---|---|---|
| Trichloro(phenyl)silane | phenyl-SiCl$_3$ | Sigma Aldrich | Acid activator |
| HCl | | Sigma Aldrich | Acid activator |
| Chlorophenylsilane | H$_2$Si(Cl)(phenyl) | Sigma Aldrich | Acid activator |
| Dichloro(phenyl)silane | Cl-SiH(Cl)-phenyl | Sigma Aldrich | Acid activator |
| Dichloromethyl(phenyl)silane | Cl$_2$Si(CH$_3$)(phenyl) | Sigma Aldrich | Acid activator |

TABLE C-continued

| Tradename | Structure | Supplier | |
|---|---|---|---|
| ChloroDimethyl Phenyl Silane | 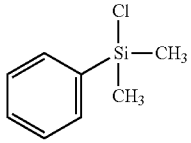 | Sigma Aldrich | Acid activator |
| ChloroTrimethylSilane | 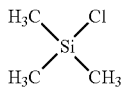 | TCI | Acid activator |
| Buty(chloro)dimethyl Silane, | 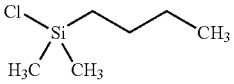 | TCI | Acid activator |
| Chloro-decyl-dimethyl Silane | 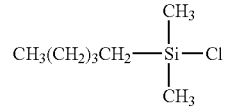 | TCI | Acid activator |
| Chloro(chloromethyl)dimethyl | 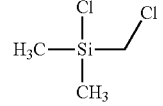 | TCI | Acid activator |
| Chloro(dichloromethyl) dimethylsilane | 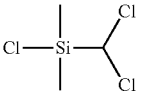 | Alfa Aesar | Acid activator |
| Pentafluoropropionic acid | 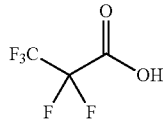 | Sigma | Non chloride Acid activator |
| Trifluoroacetic acid | 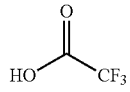 | Sigma | Non chloride Acid activator |
| Trichloroacetic acid | 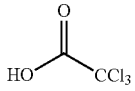 | Sigma | Acid activator |
| Trichlorododecyl silane (TCSA) | 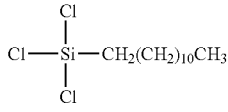 | Sigma Aldrich | Acid activator |
| Trichloro(octadecyl) silane | $CH_3(CH_2)_{16}CH_2SiCl_3$ | Sigma Aldrich | Acid activator |
| Dichlorodiphenyl silane | 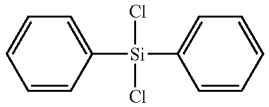 [SMILES: Cl[Si](Cl)(c1ccccc1)c1ccccc1] | Sigma Aldrich | Acid activator |

TABLE C-continued

| Tradename | Structure | Supplier | |
|---|---|---|---|
| Perfluoro decylmethychloro silane | (structure shown) | Acros | Acid activator |
| Perfluoro decylmethyl dichlorosilane | CF₃(CF₂)₇CH₂CH₂-Si(CH₃)(Cl)₂ | Acros | Acid activator |

Romp Inhibitors:

ROMP inhibitors, as described herein, are typically Lewis base compounds such as triphenyl phosphine (TPP), trialkylphosphite, for example, triethyl phosphite, thriisorpopryl phosphite, tributyl phosphite, and tricyclohexyl phosphine, and pyridine.

Any other ROMP inhibitors are contemplated.

The Modeling Material Formulations:

According to some of any of the embodiments described herein, the building material comprises two or more modeling material formulations which, upon being dispensed, can undergo a ROMP reaction.

According to some of any of the embodiments described herein, the building material comprises two or more modeling material formulations which form a ROMP system as described herein.

As is known in the art and discussed briefly hereinabove, once an active catalyst contacts a ROMP monomer, the polymerization reaction typically starts immediately, sometime without application of a curing energy, and hence modeling material formulations in which an active catalyst, as described herein, is utilized "as is", are inapplicable for 3D inkjet printing.

Embodiments of the present invention therefore relate to modeling material formulations which are designed such that, prior to exposure to a suitable condition, the ROMP system is inactive, that is a ROMP catalyst does not initiate ROMP of the monomer, and a ROMP monomer does not polymerize via ROMP to provide a respective polymer, as described herein.

Embodiments of the present invention therefore relate to modeling material formulations which are designed such that, prior to exposure to a suitable condition, the ROMP reaction is not initiated by an active catalyst, that is, prior to exposure to a suitable condition, at least 50%, preferably at least 60%, preferably at least 70%, at least 80%, at least 90%, at least 95% and even 100% of the ROMP monomers do not undergo polymerization. In other words, prior to exposure of a ROMP system to a suitable condition, no more than 40% or no more than 30% or no more than 20% or no more than 10% or no more than 5% of the monomer polymerizes via ROMP mechanism to provide a respective polymer.

Such modeling material formulations are characterized by a viscosity of no more than 35 centipoises, or no more than 25 centipoises at a temperature of the inkjet printing head during the dispensing.

In some embodiments, such modeling material formulations are characterized by the indicated viscosity at a temperature lower than 70° C. or lower than 65° C., or lower than 60° C., or lower than 50° C., or lower than 40° C. or lower than 30° C. and even at room temperature (e.g., 25° C.). Such a viscosity is indicative of the presence (e.g., of more than 80%) of non-polymerizable ROMP monomers in the formulation, or of the absence (e.g., less than 20% of the formulation) of polymeric materials obtained by ROMP in the formulation.

The modeling material formulations described herein are therefore designed such that ROMP of the ROMP monomers is not effected when the formulations pass through the inkjet printing heads.

Embodiments of the present invention further relate to modeling material formulations which are designed such that, upon exposure to a suitable condition (an inducing condition as described herein), the ROMP system becomes active, that is a ROMP catalyst is active towards ROMP of the monomer, and a ROMP monomer undergo polymerization via ROMP to provide a respective polymer.

Embodiments of the present invention relate to modeling material formulations which are designed such that, upon exposure to a suitable condition, the catalyst is active towards initiation of the ROMP reaction, that is, upon exposure to a suitable condition, at least 50%, preferably at least 60%, preferably at least 70%, at least 80%, at least 90%, at least 95% and even 100% of the ROMP monomers undergo polymerization via ROMP reaction.

Some embodiments of the present invention relate to modeling material formulations which are designed such that upon exposure to a suitable condition, at least 50%, preferably at least 60%, preferably at least 70%, at least 80%, at least 90%, at least 95% and even 100% of the ROMP monomers undergo polymerization via ROMP reaction, within a time period of less than 2 minutes, preferably less than 1 minute, preferably less than 50 seconds, preferably less than 40 seconds, and more preferably less than 30 seconds or less.

In some of any of the embodiments described herein, the building material comprises two or more a modeling material formulations. Such embodiments are also referred to herein as "dual jetting" or "multi jetting" methodology or approach.

In some of these embodiments, each of the modeling material formulations comprises only ROMP monomers as curable materials. Such embodiments are also referred to herein as "dual jetting single curing" or "multi-jetting single curing" methodology or approach.

Generally, in the above terminology, "jetting" refers to the number of modeling material formulations included in the building material, and "curing" refers to the number of polymerization reactions that occur when the dispensed layers are exposed to a curing condition (e.g., a ROMP inducing condition, or a ROMP inducing condition and one or more additional curing conditions).

It is to be noted that dual curing or multi curing refers herein to the type of polymerization reactions and not to the number of conditions applied for inducing curing.

In some of any of the embodiments described herein, the building material comprises two or more modeling material formulations which are dispensed from different inkjet printing heads (each formulation is jetted from a different printing head or a different set of printing heads) to form the layers.

Such a methodology, which is referred to herein as dual jetting, when two different modeling material formulations are used, or as multi-jetting, when more than two modeling material formulations are used, allows dispensing modeling material formulations which are absent of one or more of the components required for a polymerization or curing to occur, whereby when the formulations are dispensed and contact one another, curing and/or polymerization occurs.

In the context of some of the present embodiments, such a methodology allows separating ROMP components as described herein by including a different combination of components in each formulation, whereby none of the formulations comprises all the components required for the ROMP reaction to occur. According to these embodiments, a ROMP reaction, and optionally non-ROMP reactions, occur only on the receiving medium, and after the building material is dispensed.

In some of these embodiments, exposing the formulation to a condition for initiating ROMP can be effected by contacting the different formulations on the receiving medium (receiving tray). In some of these embodiments, exposing to a ROMP inducing condition is effected by dispensing the formulations.

Connex 3™ (Stratasys Ltd., Israel) multiple material deposition technology, is an exemplary technology that provides the possibility to separate the components of a polymerizable or curable system into different formulations. Objet Connex 3™ (Stratasys Ltd., Israel) multiple material deposition system, is a system that allows utilizing such a technology.

The two or more modeling material formulations usable in these embodiments are also referred to herein as a modeling material formulation system or as a modeling material system or as a formulation system.

In some of any of these embodiments, the building material comprises two or more modeling material formulations, and the two or more modeling material formulations are such that when combined, curing is effected by ROMP reaction.

In some of these embodiments, each of the modeling material formulations comprises a ROMP monomer (which can be the same or different).

In some of these embodiments, each of the modeling material formulations comprises a ROMP monomer (which can be the same or different), and one of the formulations further comprises a ROMP pre-catalyst which is an acid-activatable Ru-based, pre-catalyst as described herein in any of the respective embodiments.

In some of these embodiments, the building material comprises more than two the modeling material formulations, each independently comprising a ROMP monomer (which can be the same or different), and one or two of these formulations further comprises a ROMP pre-catalyst, as described herein.

In some of any of these embodiments, one or more of the modeling material formulations is devoid of a ROMP pre-catalyst, and in some embodiments, one or more of the modeling material formulations comprises a ROMP monomer and a ROMP pre-catalyst.

In some of these embodiments, each of the modeling material formulations independently comprises a ROMP monomer, one or more of the formulations further comprise a pre-catalyst, and one or more other formulations further comprise(s) an activator. In some of these embodiments, the one or more formulations that comprise the activator are devoid of the pre-catalyst. In some embodiments, the one or more formulations that comprise the pre-catalyst are devoid of an activator.

In some of these embodiments, exposing the dispensed layers to inducing condition is effected by contacting the formulations on the receiving medium, and hence comprises the formation of the dispensed layers (e.g., by jetting the modeling material formulation by the inkjet printing heads).

In some of any of the embodiments described herein, one or more, or each, of the modeling material formulations further comprises a ROMP inhibitor.

In some of any of the embodiments described herein, one or more, or each, of the modeling material formulations, further comprises additional materials, as is described in further detail hereinunder.

In some of any of the embodiments described herein, a concentration of a ROMP monomer (or monomers), in a modeling material formulation containing same ranges from about 50% to about 99%, or from about 60% to about 99%, or from about 70% to about 99%, or from about 80% to about 99%, or from about 85% to about 99%, or from about 85% to about 95%, by weight of the total weight of the modeling material formulation, including any subranges and intermediate values therebetween. In exemplary embodiments, a concentration of a ROMP monomer (or monomers), in a modeling material formulation containing same ranges from 90% to 92%, of the total weight of the formulation. The indicated concentration ranges refer to a total weight percents of the ROMP monomers, in case more than one ROMP monomer is included.

In some of any of the embodiments described herein, a concentration of a ROMP pre-catalyst or a total concentration of ROMP pre-catalysts in case a mixture of pre-catalysts is used, in a modeling material formulation containing same independently ranges from about 0.001% to about 1%, or from about 0.001% to about 0.1%, or from about 0.01% to about 0.1%, or is about 0.05%, by weight of the total weight of the modeling material formulation, including any subranges and intermediate values therebetween.

In some embodiments, a concentration of a ROMP inhibitor in a modeling material formulation containing same independently ranges from about 0.001% to about 1%, or from about 0.001% to about 0.1% by weight of the total weight of the modeling material formulation, including any subranges and intermediate values therebetween. In some embodiments, the concentration of a ROMP inhibitor ranges from about 1 to about 200 ppm, or from about 1 to about 100 ppm, or from about 1 to about 60 ppm, or from about 1 to about 40 ppm, or from about 10 to about 20 ppm of the total weight of the modeling material formulation, including any subranges and intermediate values therebetween.

In some embodiments, a concentration of a ROMP activator as described herein in a modeling material formulation containing same independently ranges from about 0.001% to about 5%, or from about 0.001% to about 2%, or from about 0.01% to about 2%, or from about 0.01% to about 1%, or from about 0.01 to about 0.5%, or from about 0.01 to about 0.2%, or is about 0.08%, by weight, of the total weight of the modeling material formulation, including any subranges and intermediate values there between.

In some of any of the embodiments described herein, a curable material (a ROMP monomer) can be a monofunctional curable material, which comprises one polymerizable group that participates in the ROMP reaction, and/or a bifunctional or multifunctional curable material, which comprises two or more polymerizable groups that participate in the ROMP reaction.

Additional Materials:

In some of any of the embodiments described herein, one or more of the modeling material formulations further comprise(s) one or more additional material(s), which are referred to herein also as non-reactive or non-curable materials, that is, materials which do not undergo polymerization and/or curing.

Such agents include, for example, surface active agents, stabilizers, antioxidants, fillers, pigments, dispersants, and/or toughening agents (or toughness modifiers, for example, impact modifying agents).

The non-reactive agents can be independently included in one or all (e.g., both) of the modeling material formulations.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticle fillers are typically useful in applications requiring low viscosity such as ink-jet applications.

In some embodiments, a modeling formulation comprises a surface active agent. A surface-active agent may be used to reduce the surface tension of the formulation to the value required for jetting or for printing process, which is typically around 10-50 dyne/cm. An exemplary such agent is a silicone surface additive.

Suitable stabilizers (stabilizing agents) include, for example, thermal stabilizers, which stabilize the formulation at high temperatures.

In some embodiments, the modeling formulation comprises one or more pigments. In some embodiments, the pigment's concentration is lower than 35%, or lower than 25% or lower than 15%, by weight.

The pigment may be a white pigment. The pigment may be an organic pigment or an inorganic pigment, or a metal pigment or a combination thereof.

In some embodiments the modeling formulation further comprises a dye.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

In some of any of the embodiments described herein, one or more of the modeling material formulations comprises a toughening agent or a mixture of toughening agents.

The phrase "toughening agent" is also referred to herein as a "toughness modifying agent" or "toughness modifier" and encompasses one or more (e.g., a mixture of two or more) toughening agents and is used herein to describe agents that modify (e.g., improve) the toughness of a material containing same.

In some embodiments, the toughness is reflected by Impact resistance and/or tensile strength.

In some embodiments, a toughness modifying agent (a toughening agent) improves the Impact resistance and/or Tensile strength of a material containing same. In some embodiments, a toughness modifying agent (a toughening agent) improves the Impact resistance of a material containing. In some embodiments, a toughness modifying agent (a toughening agent) improves the Tensile strength of a material containing same. In some embodiments, a toughness modifying agent (a toughening agent) improves the Impact resistance and the Tensile strength of a material containing same.

The phrase "toughening agent" encompasses materials referred to herein as "Impact modifying agents" or "Impact modifiers".

According to some of any of the embodiments of the present invention, the toughening agent (e.g., Impact modifying agent) is an elastomeric material.

The phrase "elastomeric material" is also referred to herein and in the art interchangeably as "elastomer" and encompasses deformable, viscoelastic polymeric materials (typically co-polymers), including rubbers, liquid rubbers and rubbery-like materials. In some embodiments, an elastomeric material as described herein comprises saturated and/or unsaturated hydrocarbon chains, preferably long hydrocarbon chains of at least 20 carbon atoms in length. In some embodiments, the hydrocarbon chains do not include heteroatoms (e.g., oxygen, nitrogen, sulfur) interrupting the chain or forming a part of the substituents of the chain.

In some embodiments, by "hydrocarbon" it is meant herein a material containing one or more chains comprised mainly (e.g., 80%, or 85% or 90%, or 95%, or 100%) of carbon and hydrogen atoms, linked to one another. Exemplary hydrocarbons include one or more alkyl, cycloalkyl and/or aryl moieties covalently linked to one another in any order.

Non-limiting examples of toughening agents include elastomeric materials such as, but not limited to, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes.

Toughening agents such as elastomeric materials can be added to the formulation by incorporating in one or more of the modeling material formulations an elastomeric material in a dispersed/dissolved phase.

According to some of any of the embodiments described herein, the elastomeric material is characterized by at least one, at least two, or all of the following: featuring a molecular weight lower than 50,000, or lower than 40,000, or, preferably, lower than 30,000, or lower than 20,000, or lower than 10,000 Daltons;

being non-reactive towards ROMP;

being dissolvable or dispersible in the one or more modeling material formulation(s) containing same; and being capable of forming a multiphase (e.g., biphasic) structure when blended with the cured modeling material.

According to some of any of the embodiments described herein, the elastomeric material is dissolvable or dispersible in the modeling material formulation comprising same.

ROMP monomers and formulations containing same are typically hydrophobic. Therefore, in some embodiments, an elastomeric material which is dissolvable or dispersible in a modeling material formulation which comprises a ROMP monomer is hydrophobic, and thereby exhibits compatibility, and dissolvability or dispersibility in the ROMP monomer formulation, which has a hydrophobic nature.

According to some of any of the embodiments described herein, the elastomeric material is selected capable of forming a multiphase (e.g., biphasic) structure when blended with the cured modeling material.

As is known in the art. Impact resistance can be improved in case of a phase separation between the impact modifying agent and the polymeric matrix with which it is blended, namely, in case where there is a biphasic or multiphasic structure of the blend.

In some embodiments, an elastomeric material that is capable of forming a multiphase (e.g., biphasic) structure when blended with the cured modeling material can be regarded as non-soluble in the polymeric matrix formed upon exposing the modeling material formulation(s) to curing condition, namely, in the cured (or partially cured) modeling material.

According to some of any of the embodiments described herein, the elastomeric material is selected such that it is dissolvable or dispersible in the modeling material comprising same, and is further capable of forming a multiphase (e.g., biphasic) structure when blended with the cured modeling material.

In some of the embodiments pertaining to an elastomeric material that is capable of forming a multiphasic structure when blended with the cured modeling material, the ROMP monomer is or comprises a DCPD or a derivative thereof, as described herein.

According to some of any of the embodiments described herein, the elastomeric material is an impact modifying agent (Impact modifier).

It is to be noted that phase separation is not required for an Impact modifying agent to provide its effect in all cases. That is, when an elastomeric material is blended with a cured modeling material formed of a ROMP monomer-containing modeling material formulation(s). Impact resistance can be improved also when there is no phase separation (no biphasic or multiphasic structure is formed).

According to some of any of the embodiments described herein, the elastomeric material is non-reactive towards ROMP. By "non-reactive towards ROMP" it is meant that the elastomeric material does feature functional groups that can participate in ROMP. As known in the art, ROMP involves materials featuring unsaturated bonds. Accordingly, exemplary elastomeric materials which are non-reactive towards ROMP are saturated polymeric materials, namely, polymers and/or copolymers which do not comprise unsaturated bonds in their backbone chain. The pendant groups of such elastomeric materials may or may not comprise unsaturated bonds.

Elastomeric materials featuring a saturated backbone chain, namely, are devoid of unsaturated bonds in their backbone chain, are defined herein as "saturated" elastomeric materials.

In some of the embodiments pertaining to an elastomeric material that is non-reactive towards ROMP, the ROMP monomer is or comprises a DCPD or a derivative thereof, as described herein.

According to some embodiments of the present invention, the elastomeric material is a low molecular weight material, as defined herein, which is a saturated polymer or co-polymer.

According to some embodiments of the present invention, the elastomeric material is a low molecular weight material, as defined herein, which is hydrophobic.

According to some embodiments of the present invention, the elastomeric material is a low molecular weight material, as defined herein, which is a saturated polymer or co-polymer and which is further characterized as hydrophobic.

According to some of these embodiments the elastomeric material is further characterized as dissolvable or dispersible in the modeling material formulation containing same and optionally further as forming a biphasic structure with the cured modeling material.

Exemplary elastomeric materials suitable for use according to some of the present embodiments include, but are not limited to, low MW EPDM such as Trilene 67 (MW=37,000 Da) or Trilene 77 (MW=27,000 Da), liquid EPR elastomers such as Trilene CP80 (MW=23,000 Da) or Trilene CP1100 (MW=6600 Da), low MW polybutenes, low MW polyisoprenes, and the like. Preferred exemplary elastomeric materials include, but are not limited to, liquid EPR elastomers and polybutenes, having MW lower than 20,000 or lower than 12,000 Daltons.

According to some of any of the embodiments, a concentration of the toughening agent (e.g., an elastomeric material as described herein), if present, may range from about 0.1% to about 20%, or from about 1 to about 20%, or from about 1 to about 15%, or from about 1 to about 12%, or from about 1 to about 10%, or from about 2 to about 10%, or from about 2 to about 8%, by weight, of the total weight of a formulation containing same, including any intermediate values and subranges therebetween.

A concentration of the toughening agent (e.g. elastomeric materials), if present, may range from about 0.10 phr to about 10 phr, or from about 0.1 phr to about 5 phr, relative to the weight of the formulation containing same.

A concentration of the toughening agent (e.g. elastomeric material) may alternatively range from about 0.1% to about 20%, or from about 1% to about 20%, or from about 1% to about 20%, or from about 5% to about 15% or from about 5% to about 10%, by weight, of the total weight of a formulation containing same, including any intermediate values and subranges therebetween.

In some embodiments, each of the modeling material formulations comprises an elastomeric material, as described herein.

Exemplary elastomers are presented in Table D below.

Other impact modifying agents, such as, for example, carbon fibers, carbon nanotubes, nanoparticles, glass fibers, aramid Keylar, polyparaphenylene benzobisoxazole Zylon, and other polar and non polar impact modifiers, are also contemplated as toughening agents as described herein.

Alternatively, or in addition, elastomeric materials other than the elastomeric materials described herein can be included. In some embodiments, a concentration of such elastomeric materials, if present, is lower than a concentration of the elastomeric materials described herein.

In some embodiments, one or more, or each, of the modeling material formulation comprises an antioxidant. In some embodiments, at least a modeling material formulation that comprises the pre-catalyst comprises an anti-oxidant. Exemplary antioxidants are presented in Table D below.

In some embodiments, one or more, or each, of the modeling material formulation comprises a proton donor. Proton donors are useful for accelerating the activation of the pre-catalyst by the activator, to thereby accelerate the ROMP reaction. For example, a proton donor, when contacted with a chlorosilane activator as described herein generates HCl, which accelerates the activation of the pre-catalyst.

The proton donors can be reactive (curable) or non-reactive. Curable proton donors include, for example, ROMP monomers which bear acidic protons (e.g. hydroxy groups).

Exemplary reactive and non-reactive proton donors are presented in Table D below. In some embodiments, the proton donor is a hydroxy alkyl, for example, 1-butanol.

A concentration of the proton donor can range from about 0.1 to about 2%, by weight, of a modeling material formulation containing same, including any intermediate values and subranges therebetween.

In some embodiments, a proton donor is included in a modeling material formulation which is devoid of the activator (e.g., a modeling material formulation which comprises a pre-catalyst).

Table D below presents exemplary non-reactive components suitable for inclusion in any one or all of the modeling material formulations described herein.

TABLE D

| Tradename | Material | Supplier | Function |
|---|---|---|---|
| Trilene CP1100 | Liquid EPR copolymer | Lion | Impact modifier |
| Trilene CP80 | Liquid EPR copolymer | Lion | Impact modifier |
| Trilene 77 | Liquid EPDM | Lion copolymer | Impact modifier |
| Trilene 67 | Liquid EPDM | Lion copolymer | Impact modifier |
| Trilene 65 | Liquid EPDM | Lion copolymer | Impact modifier |
| Ethanox 702 | 4,4'-Methylenebis (2,6-di-tert-butylphenol) | Albemarle | Antioxidant, Radical scavenger |
| BHT | 2,6-Bis(1,1-dimethylethyl)-4-methylphenol | Sigma Aldrich | Antioxidant, Radical scavenger |
| NIPOL 13121 | Liquid NBR | ZEON | Impact modifier |
| NIPOL 1312LV | Liquid NBR | ZEON | Impact modifier |
| NIPOL 13122 | Liquid NBR | ZEON | Impact modifier |
| 1-butanol | | Sigma Aldrich | Proton donor |
| 2-butanol | | Sigma Aldrich | Proton donor |
| Tert-butanol | | Sigma Aldrich | Proton donor |
| Propanol | | Sigma Aldrich | Proton donor |
| Iso-propanol | | Sigma Aldrich | Proton donor |
| Ethanol | | Sigma Aldrich | Proton donor |

TABLE D-continued

| Tradename | Material | Supplier | Function |
|---|---|---|---|
| 5-Norbornene-2,3-dimethanol | [structure with two OH groups] | Sigma Aldrich | Reactive proton donor |
| 5-Norbornene-2-methanol | [structure with OH] | Sigma Aldrich | Reactive proton donor |
| 5-Norbornen-2-ol | [structure with OH] | Sigma Aldrich | Reactive proton donor |
| 5-Norbornene-2,2-dimethanol | [structure with two OH] | Sigma Aldrich | Reactive proton donor |

Exemplary Modeling Material Formulations:

In some of any of the embodiments described herein, the modeling material formulation system comprises two modeling material formulations.

In some of these embodiments, a first modeling material formulation (also referred to herein as Part A) comprises a ROMP monomer as described herein (e.g., a RIM monomer), and a pre-catalyst as described herein (e.g., a mixture of two pre-catalysts as described herein).

In some of these embodiments, the first formulation further comprises a toughening agent as described herein, and a ROMP inhibitor, as described herein, and optionally further comprises an antioxidant and/or a proton donor. In some of these embodiments, the toughening agent is an elastomer or an elastomeric material, as described herein in any of the respective embodiments.

In some of any of these embodiments, a second modeling material formulation (also referred to herein as Part B) comprises a ROMP monomer as described herein (e.g., a RIM monomer), and an activator (e.g., an organic chlorosilane), as described herein.

In some of these embodiments, the second formulation further comprises a toughening agent as described herein. In some of these embodiments, the toughening agent is an elastomer or an elastomeric material, as described herein in any of the respective embodiments.

In exemplary embodiments, the first formulation comprises a ROMP monomer as described herein (e.g., a RIM monomer), at a concentration of from 50 to 99% or from 70 to 99%, by weight, and a pre-catalyst as described herein (e.g., a mixture of two pre-catalysts as described herein), at a concentration of from 0.01 to 0.1% by weight, and optionally further comprises a ROMP inhibitor as described herein, at a concentration of 1 to 200 ppm, or 1 to 60 ppm, as described herein, a toughening agent (e.g., an elastomeric material as described herein) at a concentration of from 0.1 to 20%, by weight, and/or an anti-oxidant, at a concentration of 0.01-5%, by weight, and/or a filler as described herein, at a concentration of 0.01-20% by weight, of the total weight of the formulation.

In some of any of these embodiments, a second modeling material formulation (also referred to herein as Part B) comprises a ROMP monomer as described herein (e.g., a RIM monomer), which can be the same or different from the ROMP monomer included in the first formulation, and a ROMP activator (e.g., an organic chlorosilane), as described herein in any of the respective embodiments.

In some of these embodiments, the second formulation further comprises a toughening agent as described herein. In some of these embodiments, the toughening agent is an elastomer or an elastomeric material, as described herein in any of the respective embodiments.

In exemplary embodiments, the second formulation comprises a ROMP monomer as described herein (e.g., a RIM monomer), at a concentration of from 50 to 99% or from 70 to 99%, by weight, and a ROMP activator as described herein (e.g., an organic chlorosilane), at a concentration of from 0.01 to 2% by weight, and optionally further comprises a toughening agent (e.g., an elastomeric material as described herein) at a concentration of from 0.1 to 20%, by weight, and/or a filler as described herein, at a concentration of 0.01-20% by weight, of the total weight of the formulation.

In some of these embodiments, the first formulation is devoid of an activator.

In some of these embodiments, the second formulation is devoid of a pre-catalyst.

The modeling material formulation system described herein provides formulations which exhibit desirable shelf-life, stability and reactivity, such that no substantial change in the formulations' viscosity and reactivity occurs during printing (e.g., in printing block and printing heads), yet an efficient printing process can be performed due to rapid hardening of the dispensed layers of the formulations.

Moreover, the modeling material formulations described herein can be utilized only with components of a ROMP system, without the need to introduce non-ROMP curable materials that may interfere with the ROMP reaction, although this is not obligatory.

The use of components of a ROMP system only allows fabrication of 3D objects which feature physic-mechanical properties such as Impact resistance and HDT which supersede properties obtained with other curable systems.

Kits:

According to some of any of the embodiments described herein, there are provided kits containing the modeling material formulations as described herein.

In some embodiments, a kit comprises a modeling material formulation system for use in a dual or multi-jetting methodology, as described herein. The components of each of the modeling material formulations (the first and second formulations, or Part A and Part B) are packaged individually in the kit and include a ROMP monomer or monomers, as described in any of the respective embodiments, a ROMP pre-catalyst, and an activator, as described herein in any of the respective embodiments.

In exemplary embodiments, each of the first and the second formulations as described herein is individually packaged in a suitable packaging material, preferably, an impermeable material (e.g., water- and gas-impermeable material), and further preferably an opaque material; and both formulations are packaged together in the kit. In some embodiments, the kit further comprises instructions to use the formulations in an additive manufacturing process, preferably a 3D inkjet printing process as described herein. The kit may further comprise instructions to use the formulations in the process in accordance with the method as described herein. In some embodiments, the kits include instructions to avoid contact between the first and second formulations at any stage before printing is effected (e.g., before the formulations are dispensed from the nozzles).

In some embodiments the kit comprises two or more modeling material formulations, at least one of the formulations comprises a ROMP monomer as described herein in any of the respective embodiments, at least one of the formulations comprises a ROMP pre-catalyst, as described herein in any of the respective embodiments, and at least one of the formulations comprises a ROMP activator as described herein in any of the respective embodiments, wherein the ROMP activator and the ROMP pre-catalyst are not in the same formulation.

In some of these embodiments, a first modeling material formulation (also referred to herein as Part A) comprises a ROMP monomer as described herein (e.g., a RIM monomer), and a pre-catalyst as described herein (e.g., a mixture of two pre-catalysts as described herein).

In some of these embodiments, the first formulation further comprises a toughening agent as described herein, and a ROMP inhibitor, as described herein, and optionally further comprises an antioxidant and/or a proton donor. In some of these embodiments, the toughening agent is an elastomer or an elastomeric material, as described herein in any of the respective embodiments.

In exemplary embodiments, the first formulation comprises a ROMP monomer as described herein (e.g., a RIM monomer), at a concentration of from 50 to 99% or from 70 to 99%, by weight, and a pre-catalyst as described herein (e.g., a mixture of two pre-catalysts as described herein), at a concentration of from 0.01 to 0.1% by weight, and optionally further comprises a ROMP inhibitor as described herein, at a concentration of 1 to 200 ppm, or 1 to 60 ppm, as described herein, a toughening agent (e.g., an elastomeric material as described herein) at a concentration of from 0.1 to 20%, by weight, and/or an anti-oxidant, at a concentration of 0.01-5%, by weight, and/or a filler as described herein, at a concentration of 0.01-20% by weight, of the total weight of the formulation.

In some of any of these embodiments, a second modeling material formulation (also referred to herein as Part B) comprises a ROMP monomer as described herein (e.g., a RIM monomer), which can be the same or different from the ROMP monomer included in the first formulation, and a ROMP activator (e.g., an organic chlorosilane), as described herein in any of the respective embodiments.

In some of these embodiments, the second formulation further comprises a toughening agent as described herein. In some of these embodiments, the toughening agent is an elastomer or an elastomeric material, as described herein in any of the respective embodiments.

In exemplary embodiments, the second formulation comprises a ROMP monomer as described herein (e.g., a RIM monomer), at a concentration of from 50 to 99% or from 70 to 99%, by weight, and a ROMP activator as described herein (e.g., an organic chlorosilane), at a concentration of from 0.01 to 2% by weight, and optionally further comprises a toughening agent (e.g., an elastomeric material as described herein) at a concentration of from 0.1 to 20%, by weight, and/or a filler as described herein, at a concentration of 0.01-20% by weight, of the total weight of the formulation.

In some of any of these embodiments, the first formulation is devoid of an activator.

In some of any of these embodiments, the second formulation is devoid of a pre-catalyst.

The Object:

According to an aspect of some embodiments of the present invention there is provided a three-dimensional object which comprises a polymeric material obtainable by ROMP of respective ROMP monomer or combination of ROMP monomers. In some of these embodiments, the 3D object is obtainable by 3D inkjet printing.

According to an aspect of some embodiments of the present invention there is provided a three-dimensional object fabricated by a 3D inkjet printing process, which is characterized by an impact resistance of at least 80 J/m.

In some embodiments, the object is characterized by an impact resistance of at least 100, at least 150, at least 180, at least 200 J/m, and even higher impact resistance Herein throughout and in the art, the phrase "impact resistance", which is also referred to interchangeably, herein and in the art, as "impact strength" or simply as "impact", describes the resistance of a material to fracture by a mechanical impact, and is expressed in terms of the amount of energy absorbed by the material before complete fracture. Impact resistance can be measured using, for example, the ASTM D256-06 standard Izod impact testing (also known as "Izod notched impact", or as "Izod impact"), and/or as described hereinunder, and is expressed as J/m.

In some embodiments, the object is characterized by heat deflection temperature (HDT) which is at least 50, at least 60, at least 60, at least 70, at least 80, at least 90, at least 100, at least 110, at least 120, at least 130° C., and even higher.

Herein throughout and in the art, the phrase "heat deflection temperature", or HDT, describes the temperature at which a specimen of cured material deforms under a specified load. Determination of HDT can be performed using the procedure outlined in ASTM D648-06/D648-07 and/or as described hereinunder.

The fabrication of 3D objects by a 3D inkjet printing process is enabled by the use of ROMP systems, as described herein.

In some embodiments, the 3D object further comprises, in at least a part thereof, a material featuring antioxidation, for example, in a form of a layer deposited on the surface of the object or a part thereof as described herein.

Figure 2:
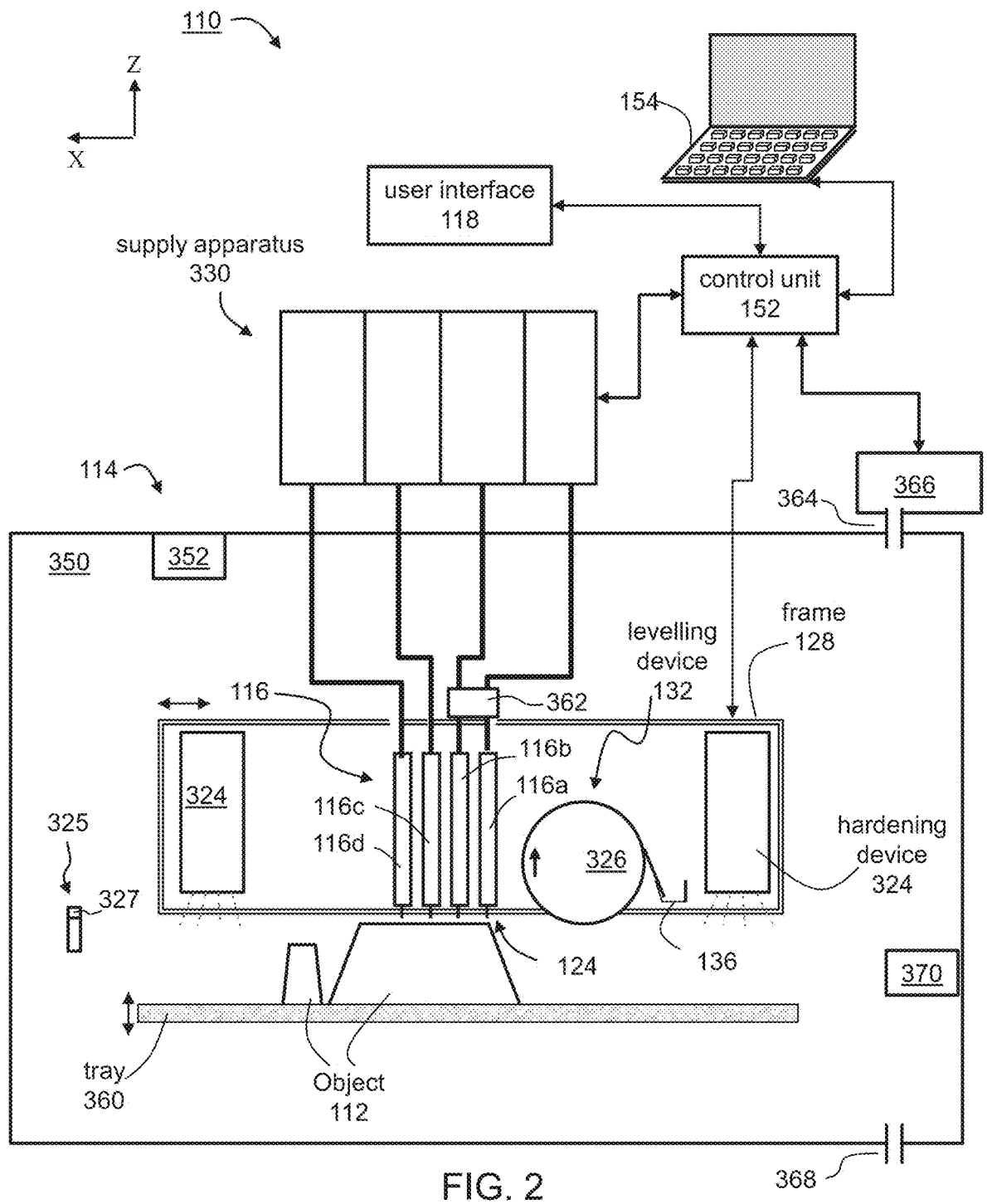
FIG. 2 is a schematic illustration of a system suitable for 3D inkjet printing of an object according to some embodiments of the present invention.

The Printing System:

FIG. 2 is a schematic illustration of a system 110 suitable for 3D inkjet printing of an object 112 according to some embodiments of the present invention. System 110 comprises a printing apparatus 114 having a printing unit 116 which comprises a plurality of printing heads. Each head preferably comprises an array of one or more nozzles 122, as illustrated in FIGS. 3A-C described below, through which a liquid (uncured) building material 124 is dispensed. Preferably, apparatus 114 is a three-dimensional inkjet printing apparatus. FIGS. 3A-B illustrate a printing head 116 with one (FIG. 3A) and two (FIG. 3B) nozzle arrays 22. The nozzles in the array are preferably aligned linearly, along a straight line. In embodiments in which a particular printing head has two or more linear nozzle arrays, the nozzle arrays are optionally and preferably can be parallel to each other. In some embodiments, two or more printing heads can be assembled to a block of printing heads, in which case the printing heads of the block are typically parallel to each other. A block including several inkjet printing heads 116a, 116b, 116c is illustrated in FIG. 3C. Printing heads 116 are optionally and preferably oriented along the indexing direction with their positions along the scanning direction being offset to one another.

Each printing head is optionally and preferably fed via a building material reservoir which may optionally include a temperature control unit (e.g., a temperature sensor and/or a heating device), and a material level sensor. To dispense the building material, a voltage signal is applied to the printing heads to selectively deposit droplets of material via the printing head nozzles, for example, as in piezoelectric inkjet printing technology. The dispensing rate of each head depends on the number of nozzles, the type of nozzles and the applied voltage signal rate (frequency). Such printing heads are known to those skilled in the art of solid freeform fabrication.

Preferably, but not obligatorily, the overall number of printing nozzles or nozzle arrays is selected such that half of the printing nozzles are designated to dispense support material formulation(s) and half of the printing nozzles are designated to dispense modeling material formulation(s). i.e. the number of nozzles jetting modeling material formulations is the same as the number of nozzles jetting support material formulations. In the representative example of FIG. 2, four printing heads 116a. 116b, 116c and 116d are illustrated. Each of heads 116a, 116b, 116c and 116d has a nozzle array. In this Example, heads 116a and 116b can be designated for modeling materials and heads 116c and 116d can be designated for support material. Thus, head 116a can dispense a first modeling material formulation, head 116b can dispense a second modeling material formulation and heads 116c and 116d can both dispense a support material formulation. In an alternative embodiment, heads 116c and 116d, for example, may be combined in a single head having two nozzle arrays for depositing a support material formulation. Preferably, heads designated to dispense different modeling material formulations are physically separated from each other in a manner that prevents the different modeling material formulations from mixing before they are dispensed out of the heads.

It is to be understood that it is not intended to limit the scope of the present invention and that the number of modeling material formulations depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that $M \times m \times p = S \times s \times q$. Each of the $M \times m$ modeling arrays and $S \times s$ support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening device 324 which can include any device configured to emit light, heat or any other curing energy that may cause the deposited material to harden. For example, hardening device 324 can comprise one or more radiation sources, which can be, for example, an infrared lamp or any other source emitting heat-inducing radiation, as further detailed hereinabove, a UV radiation source. In some embodiments of the present invention, hardening device 324 serves for applying a curing condition to the modeling material.

The printing head and radiation source are preferably mounted in a frame or block 128 which is preferably operative to reciprocally move over a tray 360, which serves as the working surface. Apparatus 114 can further comprise a tray heater 328 configured for heating the tray. These embodiments are particularly useful when the modeling material is hardened by heating (exposure to heat).

In some embodiments of the present invention the radiation sources are mounted in the block such that they follow in the wake of the printing heads to at least partially cure or solidify the materials just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward.

In various exemplary embodiments of the invention, apparatus 114 further comprises one or more leveling devices 132. Leveling device 132 serves to straighten, level and/or establish a thickness of the newly formed layer prior to the formation of the successive layer thereon. Leveling device 132 can comprise one or more rollers 326. Rollers 326 can have a generally smooth surface or can have a patterned surface. In some embodiments of the present invention one or more of the layers is straightened while the formulation within the layer is at a cured or partially cured state. In these embodiments, leveling device 132 is capable of reforming the solidified portion of the formulation. For example, when leveling device 132 comprises one or more rollers at least one of these rollers is capable of milling, grinding and/or flaking the solidified portion of the formulation. Preferably, in these embodiments, the roller has a non-smooth surface so as to facilitate the milling, grinding and/or flaking. For example, the surface of the roller can be patterned with blades and/or have a shape of an auger.

In some embodiments of the present invention one or more of the layers is straightened while the formulation within the layer is uncured. In these embodiments, leveling device 132 can comprise a roller or a blade, which is optionally and preferably, but not necessarily, incapable of effecting milling, grinding and/or flaking.

Leveling device 132 preferably comprises a waste collection device 136 for collecting the excess material generated during leveling. Waste collection device 136 may comprise any mechanism that delivers the material to a waste tank or waste cartridge. Optionally, leveling device 132 is a self-cleaning leveling device, wherein cured or partially cured formulation is periodically removed from leveling device 132. A representative Example of a self-cleaning leveling device is illustrated in FIG. 4. Shown in FIG. 4 is a double roller having a first roller 356 that contacts and straightens a layer 358 and a second roller 354 that is in contact with the first roller 356 but not with the layer 358 and which is configured to remove the formulation from the first roller 358. When first roller 356 has a non-smooth surface, second roller 354 preferably is also non-smoothed wherein the pattern formed on the surface of roller 354 is complementary to the pattern formed on the surface of roller 356, so as to allow roller 354 to clean the surface of roller 358.

Apparatus 114 can also comprise a chamber 350 enclosing at least heads 116 and tray 360, but may also enclose other components of system 110, such as, but not limited to, devices 132 and 324, frame 128 and the like. In some embodiments of the present invention apparatus 114 comprises a chamber heater 352 that heats the interior of chamber 350 as further detailed hereinabove. Chamber 350 is preferably generally sealed to an environment outside chamber 350. In some embodiments, a filter, such as, but not limited to, a carbon filter is used for evacuating vapors out of chamber 350.

In some embodiments of the present invention chamber 350 comprises a gas inlet 364 and the system comprises a gas source 366 configured for filling said chamber by an inert gas through gas inlet 364. Gas source 366 can be a container filled with the inert gas. The gas can be any of the inert gases described above. Optionally, chamber 350 is also formed with a gas outlet 368 for allowing the gas to exit chamber 350 if desired. Both inlet 366 and outlet 368 of the present embodiments are provided with valves (not shown) so as to controllably allow entry and/or exit of the gas to and from chamber 350. Preferably, controller 152 generates, continuously or intermittently, inflow and outflow of the inert gas through gas inlet 366 and gas outlet 368. This can be achieved by configuring controller 152 to control at least one of source 366, inlet 364 and outlet 368. Optionally, system 110 comprises a gas flow generating device 370, placed within chamber 350 and configured for generating a flow of the inert gas within chamber 350. Device 370 can be a fan or a blower. Controller 152 can be configured for controlling also device 370, for example, based on a predetermined printing protocol.

In some embodiments of the present invention apparatus 114 comprises a mixing chamber 362 for preparing the modeling material formulation prior to entry of the modeling material formulation into a respective head. In the schematic illustration of FIG. 2, which is not to be considered as limiting, chamber 362 receives materials from different containers, mixes the received materials and introduces the mix to two heads (heads 116b and 116a, in the present example). However, this need not necessarily be the case since in some embodiments chamber 362 can receive materials from different containers, mixes the received materials and introduces the mix only to more than two heads or only to one head. Preferably, the position and fluid communication between mixing chamber 362 and respective head is selected such that at least 80% or at least 85% or at least 90% or at least 95% or at least 99% or the modeling material formulation that enters the respective head or heads (e.g., heads 116b and 116a in the present example) remains uncured. For example, chamber 362 can be attached directly to the printing head or the printing block, such that motion of the printing head is accompanied by motion of the mixing chamber. These embodiments are particularly useful when the formulation undergoes fast polymerization reaction even in the absence of curing radiation.

In some embodiments, apparatus 114 comprises a dispensing head wiper 325, constituted for removing remnant formulations from the surface of the dispensing heads 116, by wiping. Wiper 325 can engage the nozzles of heads 116, for example, once the head completes a movement along the scanning direction or a cycle of reciprocal movements along the scanning direction. Wiper 325 can be in the form of a blade, or more preferably, can include a fabric 327 that is wetted by a solvent before engaging the nozzles of head 116. The solvent is selected to facilitate removal of uncured, partially cured or fully cured formulation from the surface of the head.

In use, the dispensing heads of unit 116 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 116 is followed by the curing of the modeling material (s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 116, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of, for example, a Standard Tessellation Language (STL) format Standard Tessellation Language (STL), StereoLithography Contour (SLC) format, Virtual Reality Modeling Language (VRML). Additive Manufacturing File (AMF) format, Drawing Exchange Format (DXF), Polygon File Format (PLY) or any other format suitable for CAD. Typically, control unit 340 controls the voltage applied to each printing head or nozzle array and the temperature of the building material in the respective printing head.

Once the manufacturing data is loaded to control unit 340 it can operate without user intervention. In some embodiments, control unit 340 receives additional input from the operator, e.g., using data processor 154 or using a user interface 118 communicating with unit 340. User interface 118 can be of any type known in the art, such as, but not limited to, a keyboard, a touch screen and the like. For example, control unit 340 can receive, as additional input, one or more building material types and/or attributes, such as, but not limited to, color, characteristic distortion and/or transition temperature, viscosity, electrical property, magnetic property. Other attributes and groups of attributes are also contemplated.

It is expected that during the life of a patent maturing from this application many relevant components of a ROMP system as described herein will be developed and the scope of the terms ROMP monomer, ROMP inhibitor, ROMP activator, ROMP pre-catalyst, is intended to include all such new technologies a priori.

As used herein the term "about" refers to +10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc, as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is An example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. More preferably, the alkyl is a medium size alkyl having 1 to 10 carbon atoms. Most preferably, unless otherwise indicated, the alkyl is a lower alkyl having 1 to 4 carbon atoms (C(1-4) alkyl). The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene (or alkenyl) and Alkyne (or alkynyl), as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyrane, morpholine, oxalidine, and the like. The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e. rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate. N-thiocarbamate, O-thiocarbamate, urea, thiourea, O-carbamate, N-carbamate. C-amide. N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide", "halogen" and "halo" describe fluorine, chlorine, bromine or iodine.

The term "haloalkyl" describes an alkyl group as defined above, further substituted by one or more halide.

The term "sulfate" describes a —O—S(=O)₂—OR' end group, as this term is defined hereinabove, or an —O—S(=O)₂—O— linking group, as these phrases are defined hereinabove, where R' is as defined hereinabove.

The term "thiosulfate" describes a —O—S(=S)(=O)—OR' end group or a —O—S(=S)=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)₂—R' end group or an —S(=O)₂— linking group, as these phrases are defined hereinabove, where R' is as defined herein.

The term "S-sulfonamide" describes a —S(=O)₂—NR'R" end group or a —S(=O)₂—NR'— linking group, as these phrases are defined hereinabove, with R' and R" as defined herein.

The term "N-sulfonamide" describes an R'S(=O)₂—NR"— end group or a —S(=O)₂—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "cyanurate" describes a

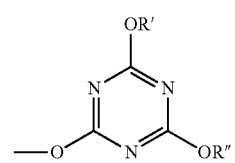

end group or

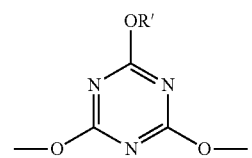

linking group, with R' and R" as defined herein.

The term "isocyanurate" describes a

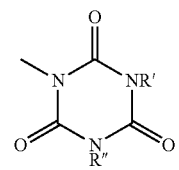

end group or

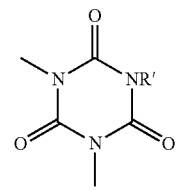

linking group, with R' and R" as defined herein.

The term "thiocyanurate" describes a

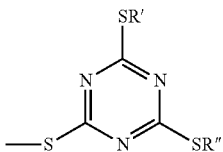

end group or

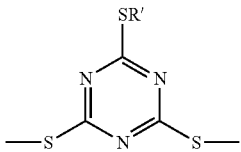

linking group, with R' and R" as defined herein.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic. R' and the carbon atom are linked together to form a ring, in C-carboxylate, and this group is also referred to as lactone. Alternatively. R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic. R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic. R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'-linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam.

Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"-linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$—R'" end group or a —O—[(CR'R")$_x$—O]$_y$— linking group, with R', R" and R'" being as defined herein, and with z being an integer of from 1 to 10, preferably, 2-6, more preferably 2 or 3, and y being an integer of 1 or more. Preferably R' and R" are both hydrogen. When z is 2 and y is 1, this group is ethylene glycol. When z is 3 and y is 1, this group is propylene glycol.

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silyl" describes a —SiR'R"R'" end group or a —SiR'R"— linking group, as these phrases are defined hereinabove, whereby each of R', R" and R'" are as defined herein.

The term "siloxy" describes a —Si(OR')R"R'" end group or a —Si(OR')R"-linking group, as these phrases are defined hereinabove, whereby each of R', R" and R'" are as defined herein.

The term "silaza" describes a —Si(NR'R")R'" end group or a —Si(NR'R")— linking group, as these phrases are defined hereinabove, whereby each of R', R" and R'" is as defined herein.

The term "silicate" describes a —O—Si(OR')(OR")(OR'") end group or a —O—Si(OR')(OR")— linking group, as these phrases are defined hereinabove, with R', R" and R'" as defined herein.

The term "boryl" describes a —BR'R" end group or a —BR'— linking group, as these phrases are defined hereinabove, with R' and R" are as defined herein.

The term "borate" describes a —O—B(OR')(OR") end group or a —O—B(OR')(O—) linking group, as these phrases are defined hereinabove, with R' and R" are as defined herein.

As used herein, the term "epoxide" describes a

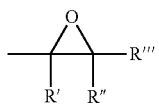

end group or a

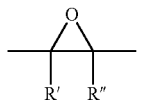

linking group, as these phrases are defined hereinabove, where R', R" and R'" are as defined herein.

As used herein, the term "methyleneamine" describes an —NR'—CH$_2$—CH=CR"R'" end group or a —NR'—CH$_2$—CH=CR"— linking group, as these phrases are defined hereinabove, where R', R" and R'" are as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O-PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein. This term encompasses ketones and aldehydes.

The term "thiocarbonyl" as used herein, describes a —C(=S)—R' end group or a —C(=S)— linking group, as these phrases are defined hereinabove, with R' as defined herein.

The term "oxime" describes a =N—OH end group or a =N—O— linking group, as these phrases are defined hereinabove.

The term "cyclic ring" encompasses a cycloalkyl, a heteroalicyclic, an aryl (an aromatic ring) and a heteroaryl (a heteroaromatic ring).

Other chemical groups are to be regarded according to the common definition thereof in the art and/or in line of the definitions provided herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

EXPERIMENTAL METHODS

Thermo-mechanical properties of the polymerized material were determined by measuring the elongation, impact strength and HDT according to respective ASTM procedures, as follows:

The impact strength of polymerized (cured) materials was measured by a Resil 5.5 J type instrument (CEAST Series, Instron® (USA)) using an Izod impact test (notched Izod) according to the ASTM International organization D-256 standard.

The Heat deflection temperature (HDT) of the samples was determined according to the ASTM International organization D-648 standard using a HDT 3 VICAT instrument (CEAST Series, Instron® (USA)).

The elongation (%) of polymerized materials was measured using Lloyd LR 5k instruments (Lloyd Instruments, UK according to the ASTM International organization D-638-05 standard.

Example 1

Modeling Material Formulation System

The present inventors have uncovered that using a "dual jetting single curing" approach in 3D inkjet printing of ROMP systems provides objects with exceptional properties. In the most suitable formulation system, a catalyst system which comprises a pre-catalyst and an acid generator as an activator or co-catalyst is used as follows: a first formulation (Part A) comprises ROMP monomer or monomers, a pre-catalyst and a ROMP inhibitor, and is also denoted as "pre-catalyst component" and a second formulation (Part B) comprises ROMP monomer or monomers, and an activator (an acid generator), and is also denoted as "activator component". In some embodiments, impact modifying agent (e.g., an elastomer) is added to one or both of the formulations.

An exemplary formulation system utilized while practicing this methodology is presented in Table 1.

TABLE 1

| Catalyst component (Part A) | | Activator component (Part B) | |
|---|---|---|---|
| Component | Concentration (w/w) | Component | Concentration (w/w) |
| RIM monomer | 90-92% | RIM monomer | 90-92% |
| Toughening agent | 1-10% | Toughening agent | 1-10% |
| ROMP inhibitor (e.g., P(OEt)₃) | 0.01-0.02% (10-20 ppm) | Activator (e.g., PhSiCl₃) | 0.05-2% |
| Ru-based pre-catalyst (e.g., VC 1161; VC843): | 0.01-0.1% | | |

Using this formulation in a 3D inkjet printing method, using Objet Connex™ (Stratasys Ltd., Israel) system, such as described herein, and post-curing the obtained object for 2 hours at 150° C., resulted in an object featuring the following properties:

HDT=130-140° C. (e.g., 138° C.)

Impact=150-350 J/m (e.g., 260 J/m)

Elongation=about 25%.

Example 2

Reactivity Assays

Reactivity assays of a formulation system as described in Example 1 above were performed as follows:

One drop (25 µL) of part A (catalyst component) was placed on a temperature-controlled aluminum surface. A drop (25 µL) of part B (activator component) was placed on the first drop. Time to cure was determined as thin film was formed. Reactivity was measured as the time required for a white color to appear after a drop of Part B was placed onto the drop of Part A.

Unless otherwise indicated, all experiments were performed using a RIM monomer (as exemplary ROMP monomers), 8% CP1100 (as an exemplary impact modifying agent), and 0.08% PhSiCl₃ (as an exemplary activator), at a temperature of 26° C.

Reactivity Studies Using Various Combinations of Pre-Catalysts:

Two exemplary Ru-based pre-catalysts were studied: VC1161 and VC843 (see. Table B). VC843 has better stability toward decomposition than VC1161. VC 1161 is more reactive than VC843 following activation. Theoretically. VC1161 allows immediate solidification of the deposited layer and VC843 is much slower but allows high conversion degree of the polymer.

P(OEt)₃ was used as an exemplary ROMP inhibitor is all tested formulations, at the indicated concentration.

Table 2 below presents the data obtained in these studies.

TABLE 2

| # | VC 1161 (% wt.) | VC843 (% wt.) | % VC 1161 | P(OEt)₃ (ppm) | Time to cure (second) |
|---|---|---|---|---|---|
| 1 | 0.0196% | 0.0294% | 40% VC1161 | 15 | 24 ± 4 |
| 2 | 0.044% | 0.0111% | 80% VC1161 | 15 | 16 ± 1 |
| 3 | 0.031% | 0.0208% | 60% VC1161 | 15 | 20 ± 1 |
| 4 | 0.0584% | — | 100% VC1161 | 15 | 12 ± 1 |
| 5 | 0.0584% | — | 100% VC1161 | 2 | 8 ± 1 |

Due to the higher conversion obtained by VC 843 and the higher reactivity of VC1161, a formulation comprising 40% VC1161 was determined as an exemplary preferred formulation.

Effect of ROMP Inhibitor Concentration:

In all the assays conducted for evaluating the effect of the concentration of a ROMP inhibitor, P(OEt)₃ was used as an exemplary ROMP inhibitor; Chlorodimethylphenyl Silane was used as an activator, at a concentration of 0.387 wt. %; and VC 1161 was used as a pre-catalyst, at a concentration of 0.0425% by weight (+1% BHT as an exemplary antioxidant).

The obtained data is presented in Table 3 below.

TABLE 3

| P(OEt)$_3$ (ppm) | Time to Cure |
|---|---|
| 0 | 26 sec |
| 2 | 33 sec |
| 5 | 38 sec |
| 15 | 50 sec |

Effect of Temperature:

The following formulation system was used in these assays:

| Compound | Weight % |
|---|---|
| Part A | |
| 10% P(OEt)$_3$ | 0.015 |
| 60% VC834:40% VC1161 | 0.049 |
| Butanol | 1 |
| 8% CP1100 in RIM monomer | 99 |
| Part B | |
| PhSiMe$_2$Cl | 0.5 |
| 8% CP1100 in RIM monomer | 99.5 |

The obtained data is presented in Table 4 below.

TABLE 4

| Temperature (° C.) | Curing time (Seconds) |
|---|---|
| 25 | 16.5 |
| 35 | 14.5 |
| 40 | 14 |
| 50 | 8 |

Higher temperatures are inapplicable due to volatility and flammability of ROMP monomers. A temperature of 50° C. provides satisfactory reactivity.

Effect of Pentafluoropropionic Acid Concentration:

The effect of pentafluoropropionic acid as an activator, at various concentrations, was evaluated, while using as a pre-catalyst a 40:60 VC1161:VC843 mixture. The obtained data is presented in Table 5 below.

TABLE 5

| Concentration of activator (Wt. %) | Time to Cure | HDT |
|---|---|---|
| 0.2 | 1 min 5 sec | 54.3 |
| 0.6 | 25 sec | 60.2 |
| 1.8 | 13 sec | 70.4 |

Effect of Activator Type:

In this set of experiments. Part A formulations containing 20 grams of RIM monomer with 8% CP1100 and 0.012 gram of VC1161 as a pre-catalyst was used. The Part B formulation contained 1.99 grams RIM monomer with 8% CP1100, and 0.01 gram (0.5% by weight) of an activator. The obtained data is presented in Table 6 below.

TABLE 6

| Activator chemical name | Activator structure | Time to Cure (Sec) |
|---|---|---|
| ChloroDimethyl Phenyl Silane, M$_w$ = 170.71 g/mol | PhSi(CH$_3$)$_2$Cl | 92, 75, 83 |
| ChloroTrimethylSilane, M$_w$ = 108.64 g/mol | (CH$_3$)$_3$SiCl | 36, 36, 37 |
| Butyl(chloro)dimethyl Silane, M$_w$ = 150.72 g/mol | ClSi(CH$_3$)$_2$(C$_4$H$_9$) | 66, 63, 64 |
| Chloro-decyl-dimethyl Silane, M$_w$ = 234.88 g/mol | CH$_3$(CH$_2$)$_6$CH$_2$—Si(CH$_3$)$_2$—Cl | 120, 100 |
| Chloro(chloromethyl)dimethyl Silane, M$_w$ = 143.09 g/mol | H$_3$C—Si(CH$_3$)(Cl)—CH$_2$Cl | 20, 23, 22 |

TABLE 6-continued

| Activator chemical name | Activator structure | Time to Cure (Sec) |
|---|---|---|
| Trichloro(phenyl)silane, $M_w$ = 211.55 g/mol | 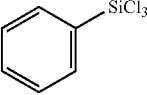 | 16, 13, 11 |
| Trichlorododecyl silane (TCSA) $M_w$ = 303.77 g/mol | 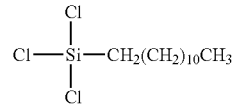 | 22, 23, 21 |
| Trichloro(octadecyl) silane $M_w$ = 387.93 g/mol | $CH_3(CH_2)_{16}CH_2SiCl_3$ | 25, 25, 26 |
| Dichlorodiphenyl silane $M_w$ = 253.20 g/mol | 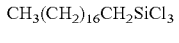 | 110, 113, 111 |
| Perfluoro decyldimethylchloro silane $M_w$ = 540.73 g/mol | 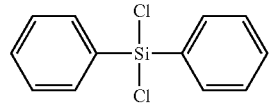 [SMILES: Cl[Si](Cl)(c1ccccc1)c1ccccc1] | Gelation only |
| Perfluoro decylmethyl dichlorosilane 561.14 g/mol | 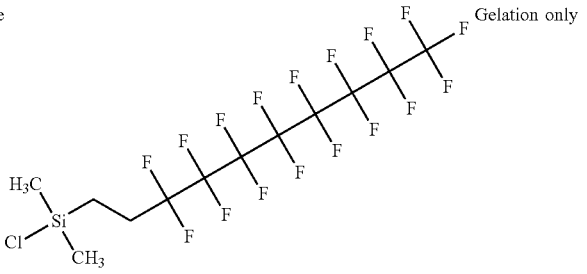 | Gelation only |

Trichloro(phenyl)silane was shown to be the most efficient activator. This activator, however, is sensitive to moisture and requires operating the printing system under inert atmosphere. Chlorodimethylphenyl Silane is less efficient as activator, but allows continuous jetting under air conditions.

Chloro(dichloromethyl) methyl silane (DDS) was shown as a moderate activator but allows performing the printing process without affecting the printing heads. This material, however, is volatile.

Effect of Activator Concentration:

The effect of various concentrations of Chlorodimethylphenyl Silane as an activator in the Part B formulation was tested while using a Part A formulation comprising 0.0586% by weight of VC1161 (26300/1 monomer/pre-catalyst ratio). The results are presented in Table 7 below.

TABLE 7

| activator | Activator w/w % | Time to cure (Sec) |
|---|---|---|
| 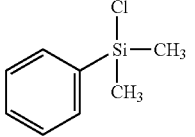 | 0.129 | 25 |
| 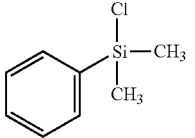 | 0.387 | 17 |

TABLE 7-continued

| activator | Activator w/w % | Time to cure (Sec) |
|---|---|---|
| 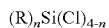 | 0.50 | 13 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of fabricating a three-dimensional object, the method comprising sequentially forming a plurality of layers in a configured pattern corresponding to the shape of the object, thereby fabricating the object, wherein said formation of each layer comprises dispensing at least two modeling material formulations by at least two inkjet printing heads, each head jetting one of said at least two modeling material formulations, said at least two modeling material formulations comprising an unsaturated cyclic monomer polymerizable by ring opening metathesis polymerization (ROMP) and a catalyst system for initiating ROMP of said monomer, said catalyst system comprising a pre-catalyst and an activator for chemically activating said catalyst towards initiating ROMP of said monomer, wherein at least one of said modeling material formulations comprises said pre-catalyst and at least another modeling material formulation comprises said activator and is devoid of said pre-catalyst, wherein said pre-catalyst is an acid-activatable ruthenium-based pre-catalyst and said activator is active towards chemically activating said pre-catalyst, wherein said pre-catalyst comprises at least two pre-catalysts, wherein one of said pre-catalysts is

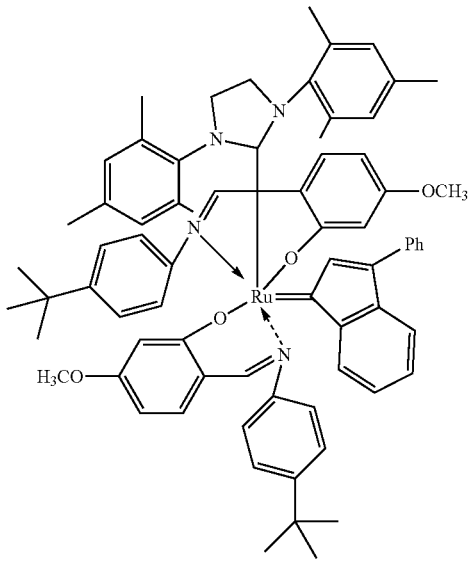

and another one of said pre-catalysts is

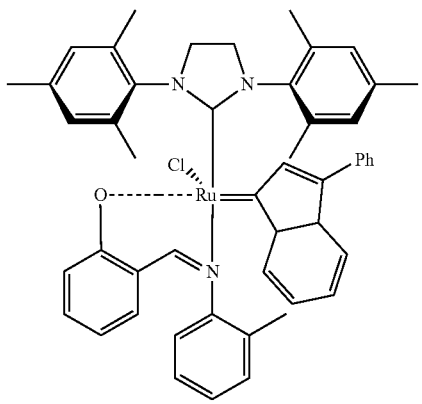

2. The method of claim 1, wherein said activator is represented by Formula:

(R)$_n$Si(Cl)$_{4-n}$ wherein:

n is 1, 2, or 3, and R is selected from hydrogen, alkyl and aryl, such that when n is 2 or 3, each R can be the same or different, wherein at least one R is selected from alkyl and aryl.

3. The method of claim 1, wherein at least one of said modeling material formulations further comprises a toughening agent.

4. The method of claim 1, wherein a temperature of an inkjet printing head for dispensing said at least one modeling material formulation ranges from 25° C. to 65° C. or from 65° C. to about 85° C.

5. The method of claim 1, wherein a weight ratio between said pre-catalysts ranges from 90:10 to 10:90.

6. The method of claim 5, wherein said weight ratio ranges from 60:40 to 40:60.

* * * * *